(12) United States Patent
Boyapalle et al.

(10) Patent No.: US 12,549,382 B2
(45) Date of Patent: Feb. 10, 2026

(54) METHOD AND APPARATUS FOR DEVICE IDENTIFIER COMPOSITION ENGINE CERTIFICATE-BASED SECURITY AND OUT-OF-BAND TEMPORARY KEY GENERATION FOR BLUETOOTH PAIRING

(71) Applicant: Dell Products, LP, Round Rock, TX (US)

(72) Inventors: Anantha K. Boyapalle, Cedar Park, TX (US); Kai Leong Wong, Singapore (SG); Nicholas D. Grobelny, Evergreen, CO (US)

(73) Assignee: DELL PRODUCTS LP, Round Rock, TX (US)

( * ) Notice: Subject to any disclaimer, the term of this patent is extended or adjusted under 35 U.S.C. 154(b) by 232 days.

(21) Appl. No.: 18/105,386

(22) Filed: Feb. 3, 2023

(65) Prior Publication Data
US 2024/0267232 A1   Aug. 8, 2024

(51) Int. Cl.
*H04L 9/32* (2006.01)
*H04L 9/08* (2006.01)
*H04W 12/037* (2021.01)

(52) U.S. Cl.
CPC .......... *H04L 9/3263* (2013.01); *H04L 9/0869* (2013.01); *H04W 12/037* (2021.01)

(58) Field of Classification Search
CPC ..... H04L 9/3263; H04L 9/0869; H04W 12/50
See application file for complete search history.

(56) References Cited

U.S. PATENT DOCUMENTS 8,842,841 B2   9/2014 Hook
10,735,467 B2   8/2020 Yang
(Continued)

FOREIGN PATENT DOCUMENTS

WO   2017/207680 A1   12/2017

OTHER PUBLICATIONS

Authors: John Padgette Title: "Guide to Bluetooth Security", NIST Special Publication 800-121, Revision 2 Published: May 2017 (Year: 2017).*

(Continued)

*Primary Examiner* — Jeffrey Nickerson
(74) *Attorney, Agent, or Firm* — Prol Intellectual Property Law, PLLC; H. Kenneth Prol

(57) ABSTRACT

An information handling system includes a hardware processor and a memory device to execute code instructions of an automatic peripheral device pairing management system pairing agent to receive, via a wireless interface adapter, a device identifier composition engine (DICE) certificate from a wireless peripheral device indicating the identity of the wireless peripheral device, the DICE certificate including a public key. The hardware processor executes computer readable program code of an out-of-band (OOB) temporary key generator agent to generate an OOB temporary key. The hardware processor executes the computer readable program code of the automatic peripheral device pairing management system pairing agent to encrypt the OOB temporary key using the public key. The hardware processor to sends the public key-encrypted OOB temporary key to the wireless peripheral device to be decrypted using a private key at the wireless peripheral device. The hardware processor executes a confirm value generation function to confirm that the OOB temporary key matches the decrypted OOB temporary key at the wireless peripheral device to automatically Bluetooth® (BT) pair the information handling system to the wireless peripheral device.

20 Claims, 6 Drawing Sheets

(56) References Cited

U.S. PATENT DOCUMENTS

| | | |
|---|---|---|
| 11,012,227 B2 | 5/2021 | Lim |
| 11,102,653 B2 | 8/2021 | Li |
| 11,233,588 B2 | 1/2022 | Nagata |
| 11,552,803 B1* | 1/2023 | Simkhada ............... G06F 21/73 |
| 2006/0171540 A1* | 8/2006 | Lee ...................... H04L 9/0822 |
| | | 380/277 |
| 2007/0055865 A1* | 3/2007 | Kakii ................... H04L 9/3263 |
| | | 713/156 |
| 2008/0022103 A1* | 1/2008 | Brown ................. H04L 9/3268 |
| | | 713/175 |
| 2016/0286341 A1* | 9/2016 | Lee ....................... H04W 76/14 |
| 2016/0360345 A1* | 12/2016 | Kim ...................... H04W 76/14 |
| 2017/0237301 A1* | 8/2017 | Elad ................... H02J 7/00034 |
| | | 307/104 |
| 2017/0290077 A1* | 10/2017 | Nilsson ................ H04W 12/04 |
| 2018/0176198 A1* | 6/2018 | Rajapaksa ........... H04L 63/0442 |
| 2018/0365449 A1 | 12/2018 | Meriac |
| 2019/0281449 A1* | 9/2019 | Luo ................... H04W 12/0431 |
| 2019/0321732 A1* | 10/2019 | Zimring ................ A63F 13/235 |
| 2020/0084050 A1* | 3/2020 | Mensch ................ H04L 9/3263 |
| 2020/0294028 A1* | 9/2020 | Lee .................... G06Q 20/3278 |
| 2020/0314074 A1* | 10/2020 | Mondello ........... H04L 63/1466 |
| 2020/0344599 A1 | 10/2020 | Duo |
| 2020/0344608 A1 | 10/2020 | Duo |
| 2021/0227391 A1 | 7/2021 | Duo |
| 2022/0292203 A1* | 9/2022 | Severns-Williams ....................... G06F 21/57 |
| 2022/0327548 A1 | 10/2022 | Howald |
| 2023/0021881 A1 | 1/2023 | Tate |
| 2023/0177148 A1* | 6/2023 | Saroiu ................... G06F 21/602 |
| | | 726/22 |
| 2024/0007862 A1* | 1/2024 | Bud ........................ H04W 4/80 |
| 2024/0030753 A1* | 1/2024 | Kim ........................ H02J 50/80 |

OTHER PUBLICATIONS

Aura et al; "RFC 9140 Nimble Out-of-Band Authentication for EAP (EAP-NOOB)", IETF; Dec. 2021, pp. 1-51.*

Itu; "Series X: Data Communication Networks: Directory"; International Telecommunication Union; Nov. 1988; pp. 1-30.*

Kambourakis et al; "A State-of-the-Art Review on the Security of Mainstream IoT Wireless PAN Protocol Stacks"; Symmetry 2020, 12, 579; pp. 1-29.*

Trusted Computing Group; "DICE Certificate Profiles"; version 1.0; Jul. 23, 2020; TCG; pp. 1-13.*

* cited by examiner

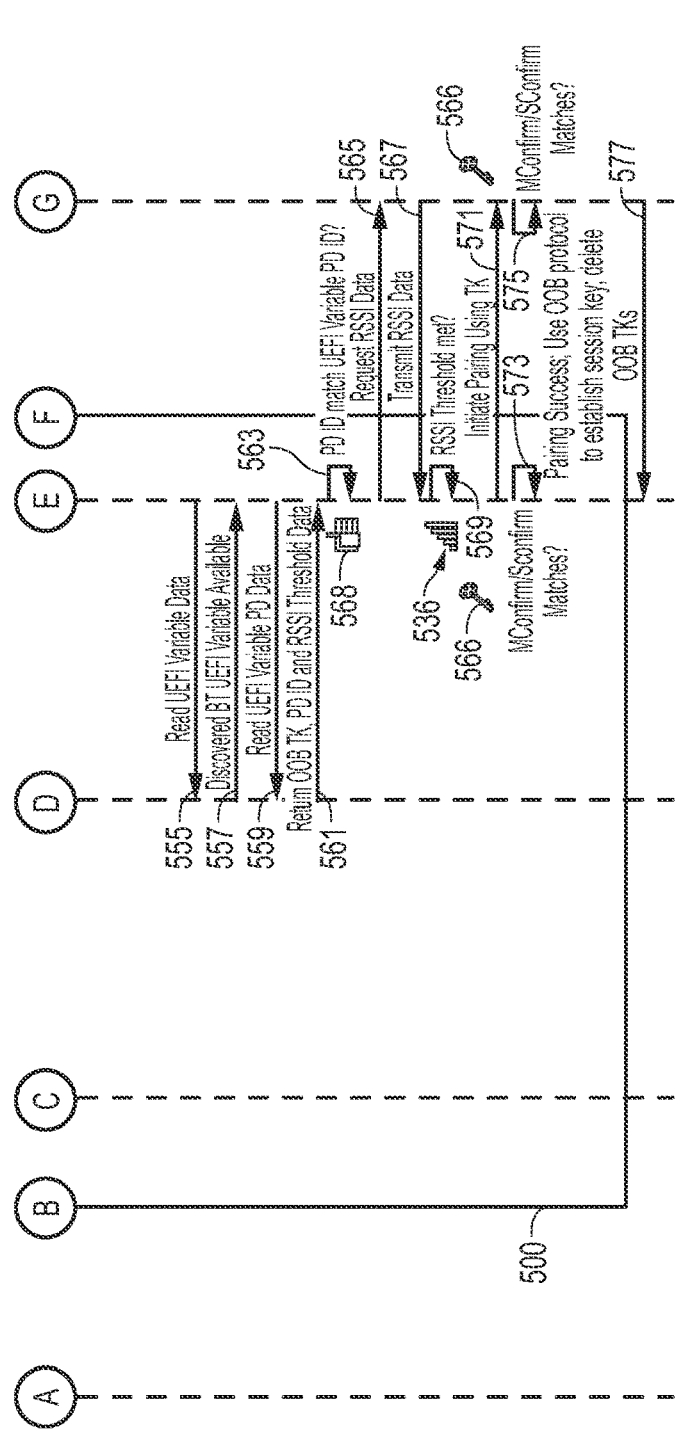

METHOD AND APPARATUS FOR DEVICE IDENTIFIER COMPOSITION ENGINE CERTIFICATE-BASED SECURITY AND OUT-OF-BAND TEMPORARY KEY GENERATION FOR BLUETOOTH PAIRING

FIELD OF THE DISCLOSURE

The present disclosure generally relates to Bluetooth pairing of a peripheral device with an information handling system. The present disclosure more specifically relates to automatic querying, verification, and pairing of a peripheral device with an information handling system using device identifier composition engine (DICE) certificate authentication and out-of-band temporary key generation.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Still further, information handling systems may be operatively coupled to, via a pairing process, various peripheral devices that allow a user to interact with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 5A and 5B are a process flow diagram of a method of automatically querying, verifying, and Bluetooth® pairing a wireless peripheral device to an information handling system using a DICE certificate received from a wireless peripheral device according to another embodiment of the present disclosure.

The use of the same reference symbols in different drawings may indicate similar or identical items.

DETAILED DESCRIPTION OF THE DRAWINGS

Figure 1:
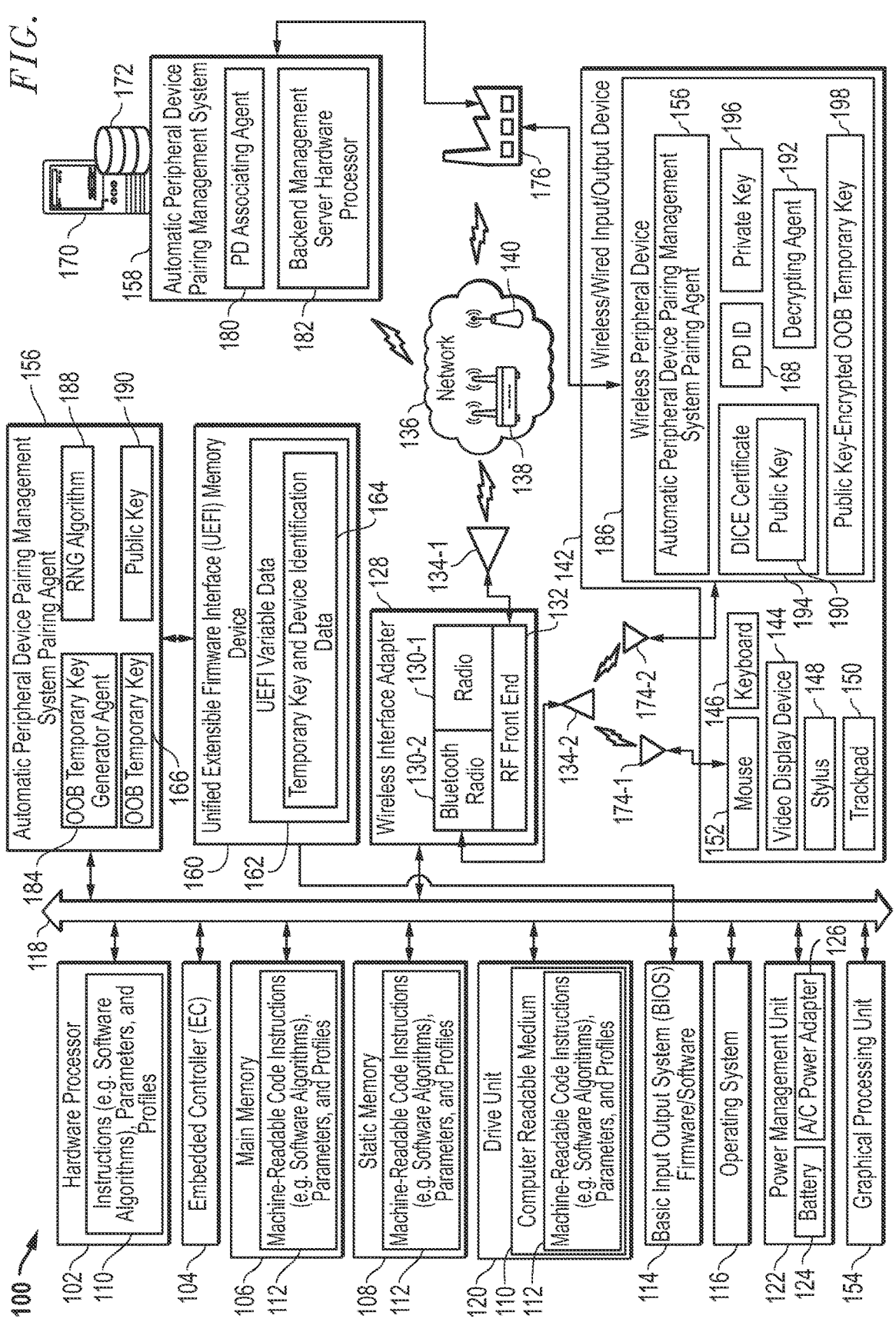
FIG. 1 is a block diagram of an information handling system and a wireless peripheral device (PD) including a peripheral device pairing management system pairing agent to pair with the information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems operate to provide computing, data storage, and application resources among other computing resources. A plurality of peripheral devices may be operatively coupled, wirelessly, to the information handling system such as via a Bluetooth® (BT) wireless protocol. The wireless peripheral devices allow the user to interact with the information handling system by receiving output and proving input to the information handling system. Some peripheral devices may serve as both input and output devices. Although some peripheral devices may have a wired connection with the information handling system, wireless peripheral devices are operatively coupled to the information handling system via a radio of a wireless interface adapter in the information handling system and a radio located within the wireless peripheral devices, for example BT wireless systems. In order to allow for the operative coupling of a wireless peripheral device to the information handling system, the wireless peripheral device may initiate a pairing process. This pairing process, in order for the operative coupling to be secure, includes security protocols that securely couple the wireless peripheral device to the information handling system. This prevents the wireless peripheral device from being operatively coupled to or hacked from information handling systems that are not associated with the user. In some instances, this requires the user to input certain pairing credentials such as a unique number in order to pair the wireless peripheral device with the information handling system. Along with this pairing process requiring user input to initiate the pairing process (e.g., not being automatic), is not always entirely secure and could result in a third-party gaining control of the wireless peripheral device using another information handling system with leak of a code or intercept of the pairing exchange. Further, such a manual pairing process can be cumbersome for users.

The present specification describes an information handling system that includes a hardware processor, a memory device, and a power management unit (PMU) to provide power to the hardware processor and memory device. The information handling system may be available to pair with a wireless peripheral device (PD) via a touchless, automatic query, verification, and pairing system of embodiments herein. The hardware processor of the information handling system executes computer readable program code of an automatic peripheral device pairing management system pairing agent to receive, via a wireless interface adapter, a device identifier composition engine (DICE) certificate from a wireless peripheral device indicating the identity of the wireless peripheral device. In an embodiment, the DICE certificate includes a public key used to encrypt or wrap an out-of-band (OOB) temporary key used to communicate to the wireless peripheral device in order to Bluetooth® (BT) pair with the wireless peripheral device. The public key is part of a cryptographic asymmetric public key/private key pair of cryptographic keys.

The hardware processor the information handling system also executes computer readable program code of OOB temporary key generator agent in order to generate the OOB temporary key. In an embodiment, the OOB temporary key generator agent may use a random number generator (RNG) to generate a unique OOB temporary key that is cryptographic key that is ephemeral and used in embodiments herein to verify BT pairing between an information handling system and a wireless peripheral device.

In an embodiment, the hardware processor of the information handling system executes computer readable program code of the automatic peripheral device pairing management system pairing agent to encrypt or wrap the OOB temporary key using the public key. The encryption of the OOB temporary key allows the security of the BT pairing process to be maintained to prevent man-in-the-middle attacks when the OOB temporary key is transmitted to or between the information handling system and the wireless peripheral device. The hardware processor, in an embodiment, may, via the wireless interface adapter, send the public key-encrypted OOB temporary key to the wireless peripheral device to be decrypted using a private key at the wireless peripheral device. Still further, the hardware processor executes a confirm value generation function to confirm that the OOB temporary key matches the decrypted OOB temporary key at the wireless peripheral device to verify and automatically BT pair the information handling system to the wireless peripheral device. The systems and methods described herein secure that sensitive pairing data (e.g., the OOB temporary key) up until the wireless peripheral device is verified to be paired with the information handling system. The sensitive pairing data may also only be exposed for a short period during automatic verification of the BT pairing.

The pairing process may end with the information handling system and wireless peripheral device establishing a session key and establishing a BT wireless link. In one embodiment, the hardware processor executing computer readable program code of the automatic peripheral device pairing management system pairing agent deletes the OOB temporary keys derived or generated after the information handling system has been BT paired with the wireless peripheral device.

FIG. 1 illustrates an information handling system 100, similar to information handling systems according to several aspects of the present disclosure including an information handling system 100. It is contemplated that several of the hardware components and the aspects shown of the information handling system 100 may also apply to a backend management server 170 which, in some embodiments, provides DICE certificates used to facilitate the pairing of the information handling system to the wireless peripheral device. For example, the backend management server 170 may execute code instructions of a peripheral device (PD) associating agent 180 via a hardware processor to associate a user of the information handling system 100 with a peripheral device identification (PD ID) and DICE certificate received by the information handling system from the wireless peripheral device according to an embodiment. The backend management server 170 also executes code instructions of an automatic peripheral device pairing management system 158 via a hardware processor such as backend management server hardware processor 182 to maintain a backend server database 172 correlating PD IDs 168 and DICE certificates with specific users of one or more information handling systems 100 according to embodiments herein. In an embodiment, the information handling system 100 may be referred to herein as a backend-coupled information handling system when the backend management server 170 interacts with the information handling system in this manner.

In other embodiments, the backend management server may not be required and a wireless peripheral device manufacturer 176 may provide a DICE certificate 194 to the information handling system 100 and cause the same to be stored on the wireless peripheral device 186 and/or, in some embodiments, on the backend management server database 172. The information handling system 100 executes, with a hardware processor 102, embedded controller 104, or other hardware processing resources, an automatic PD pairing management system pairing agent 156 that may interface with a backend management server 170 executing code instructions of the automatic peripheral device pairing management system 158 or with a manufacturer 176 in various embodiments described herein to facilitate, for example, an association of the wireless peripheral device 186 with the user's information handling system 100. In the embodiments described herein, the information handling system 100 or other information handling systems described herein includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, the information handling system 100 or other information handling system described herein can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a two-in-one computer, a tablet, a smartphone, a communications device, an access point (AP), a base station transceiver, a wireless telephone, a control system, a camera, a scanner, a printer, a personal trusted device, a web appliance, or any other suitable machine capable of executing a set of machine-readable code instructions (sequential or otherwise) that specify actions to be taken by that machine, and can vary in size, shape, performance, price, and functionality.

In a networked deployment, the information handling system 100 or the backend management server 170 may operate in the capacity of a server or as a client computer in a server-client network environment, or as a peer computer system in a peer-to-peer (or distributed) network environment. In a particular embodiment, the information handling system 100 or the backend management server 170 can be implemented using electronic devices that provide voice, video, or data communication. For example, an information handling system 100 or the backend management server 170 may be any mobile or other computing device capable of executing, via a hardware processing resource, a set of machine-readable code instructions (sequential or otherwise) that specify actions to be taken by that machine. In an embodiment, the information handling system 100 may be operatively coupled to a server such as the backend management server 170 or other network device as well as with any wireless peripheral devices 142. Further, while a single information handling system 100 is illustrated, the term "system" shall also be taken to include any collection of hardware systems or hardware sub-systems that individually or jointly utilize one or more hardware processing resources to execute a set, or multiple sets, of machine-readable code instructions to perform one or more computer functions.

The information handling system 100 may include memory (volatile (e.g., random-access memory, etc.), non-volatile (read-only memory, flash memory etc.) or any combination thereof), one or more hardware processing resources, such as a hardware processor 102, a central processing unit (CPU), a graphics processing unit (GPU) 154, an embedded controller (EC) 104, other hardware processing device, hardware controller, or any combination thereof. Additional components of the information handling system 100 can include one or more storage devices, one or more communications ports for communicating with external devices, as well as various input and output (I/O) devices 142, such as a keyboard 146, a mouse 152, a video display device 144, a stylus 148, a trackpad 150, or any combination thereof. It is appreciated that the wireless peripheral device 186 shown in FIG. 1 can be any of the types of peripheral devices and/or wireless/wired input/output device 142 and the systems and methods described herein apply to any type of wireless peripheral device 186 described herein. The information handling system 100 can also include one or more buses 118 operable to transmit data communications between the various hardware components described herein. Portions of an information handling system 100 may themselves be considered information handling systems and some or all of which may be wireless. It is appreciated, as well, that the structure and hardware of the information handling system 100 described herein may also apply to the backend management server 170. For purposes of the present specification, the information handling system 100 is used to communicate with the backend management server 170 which, in some embodiments, provides DICE certificate authentication using a root of trust DICE certificate. For purposes of the present specification, an information handling system 100 includes those information handling systems that receive a DICE certificate 194 used to query, verify, and Bluetooth® (BT) pair the wireless peripheral device 186 to the information handling system 100. In an embodiment, an OOB temporary key 166 may be generated at the information handling system 100 or even at the backend management server 170 executing computer readable program code of a OOB temporary key generator agent 184 in some embodiments. The OOB temporary key generator agent 184 may be used to direct the execution of a random number generator (RNG) algorithm 188, also referred to as a cryptographic key generating algorithm. The output of the RNG algorithm 188, in an embodiment, results in the creation of the OOB temporary key 166 which is a cryptographic key that may be shared with the wireless peripheral device 186 for later verification of matching between the information handling system 100 and the wireless peripheral device 186 as described herein. Also, the wireless peripheral device manufacturer 176 may securely transmit the DICE certificate 194 and PD ID 168 to the information handling system 100 for automatic querying, verification, and BT pairing with a wireless peripheral device 186. The hardware processor 102 or embedded controller (EC) 104 may execute the automatic peripheral device pairing management system pairing agent 156 to compare the generated OOB temporary key 166 with same provided to and stored at the wireless peripheral device 186 via a confirm value generation function executed on both sides for Bluetooth® (BT) pairing verification. Although FIG. 1 shows a single information handling system 100, the present specification contemplates that multiple information handling systems 100 may each receive a DICE certificate 194 that is used to securely share the OOB temporary key 166 and to verify the association of the wireless peripheral device 186 to the information handling systems 100.

The information handling system 100 or the backend management server 170 can include devices or modules that embody one or more of the hardware devices or hardware processing resources to execute machine-readable code instructions for the one or more systems and modules described above and operates to perform one or more of the methods described herein. In an example, machine-readable code instructions may be executed by an EC, a CPU, the hardware processor 102, or other hardware processing resource such as an embedded controller (EC) 104 for the automatic peripheral device pairing management system pairing agent 156, the OOB temporary key generator agent 184, or the RNG algorithm 188, in some embodiments. Similarly, a hardware controller (e.g., a microcontroller) at the wireless peripheral device 186 may execute code instructions of an automatic peripheral device pairing management system pairing agent 156, a DICE certificate encryption agent 184, and a decrypting agent 192 in embodiments herein. In another example, machine-readable code instructions may be executed by an EC, a CPU, backend management server hardware processor 182, or other hardware processing resource of a backend management server 170 for an automatic peripheral device pairing management system 158 or execute instructions of a peripheral device (PD) associating agent 180 in an embodiment.

The information handling system 100 and wireless peripheral device 186 may each execute counterpart code instructions of the automatic peripheral device pairing management system pairing agent 156 to control the discovery, verification, and initialization of BT pairing of a wireless peripheral device 186 to an information handling system 100. A hardware processor 102, for example, at the information handling system 100 executing the automatic peripheral device pairing management system pairing agent 156 may conduct verification and pairing with an OS BT stack (not shown) and a OOB temporary key generator agent 184 as described in embodiments herein. The information handling system 100 may include machine-readable code instructions, parameters, and profiles 112 executed via hardware processing resources that may operate on servers or systems, remote data centers, or on-box in individual client information handling systems according to various embodiments herein. In some embodiments, it is understood any or all portions of machine-readable code instructions, parameters, and profiles 112 may operate on a plurality of information handling systems 100.

The information handling system 100 and/or the backend management server 170 may include hardware processing resources such as a hardware processor 102 (or a backend management server hardware processor 182), a central processing unit (CPU), accelerated processing unit (APU), a neural processing unit (NPU), a vision processing unit (VPU), the EC 104, a digital signal processor (DSP), a graphical processing unit (GPU) 154, a microcontroller, or any other type of hardware processing device that executes machine-readable code instructions to perform the processes described herein. Any of the hardware processing resources may operate to execute code that is either firmware or software code. Moreover, the information handling system 100 and/or the backend management server 170 can include memory such as main memory 104, static memory 108, and drive unit 120 (volatile (e.g., random-access memory, etc.), nonvolatile (read-only memory, flash memory etc.) or any combination thereof) that stores machine-readable code instructions, parameters, and profiles 112 including machine-readable code instructions, parameters, and profiles 112 of, in an example embodiment, an automatic PD pairing management system pairing agent 156, an OOB temporary key generator agent 184, an RNG algorithm 188, an automatic peripheral device pairing management system 158, a PD associating agent 180, or other computer executable program code as described in embodiments herein. A hardware controller (not shown) on the wireless peripheral device 186 may also execute code instructions of a counterpart automatic PD pairing management system pairing agent 156. In embodiments described herein, computer-readable program code associated with the automatic PD pairing management system pairing agent 156, the automatic peripheral device pairing management system 158, or the PD associating agent 180, may be stored on non-volatile memory such as main memory 104 or other memory such as static memory 108 and may be made to be accessible by a hardware processing device such as an EC 104 or the hardware processor 102 for execution. Similarly, wireless peripheral device 186 may also have memory to store code instructions and data described herein. In one example embodiment, an information handling system may operate, in whole or in part, hardware processing resources executing code instructions of the automatic peripheral device pairing management system pairing agent 156 in coordination with the wireless peripheral device 186 according to embodiments herein.

As shown, the information handling system 100 and/or the backend management server 170 may further include a video display device 144. The video display device 144, in an embodiment, may function as a liquid crystal display (LCD), an organic light emitting diode (OLED), a flat panel display, or a solid-state display. Although FIG. 1 shows a single video display device 144 with the information handling system 100, the present specification contemplates that multiple video display devices 144 may be used with the information handling system 100 and/or the backend management server 170 to facilitate an extended desktop scenario, for example. In an embodiment, the video display device 144 may be used as an output device that allows the user to interact with the information handling system 100 and/or the backend management server 170. In one embodiment, the video display device 144 may be BT wirelessly coupled to the information handling system 100 via the methods described herein and via execution of the automatic PD pairing management system pairing agent 156, OOB temporary key generator agent 184, and an OS BT stack by a hardware processing resource (e.g., EC 104, hardware processor 102, etc.).

In embodiments herein, the information handling system 100 may include one or more input/output devices 142 that may be wireless or wired including an alpha numeric input device such as a keyboard 146 and/or a cursor control device, such as a mouse 152, touchpad/trackpad 150, a stylus 148, or a gesture or touch screen input device associated with the video display device 144 that allow a user to interact with the images, windows, and applications presented to the user. In an embodiment, the video display device 144 may provide output to a user that includes, for example, one or more windows describing one or more instances of applications being executed by the hardware processor 102 of the information handling system 100 and/or backend management server hardware processor 182 of the backend management server 170.

The information handling system 100 and/or the backend management server 170 may further include a network interface device. The network interface device may be a wired network interface card in some embodiments. The network interface device of the information handling system 100 as shown may also be a wireless interface adapter 128 according to another embodiment and can provide wireless connectivity among devices (e.g., wireless peripheral devices 186 such as the input/output devices 142) such as with various Bluetooth® (BT) protocols including Bluetooth® Low Energy (BLE) as well as wired network connectivity. Wired or wireless connectivity to a network 136 via a network interface device using, e.g., a wide area network (WAN), a local area network (LAN), wireless local area network (WLAN), a wireless personal area network (WPAN), a wireless wide area network (WWAN), or other network is contemplated in embodiments herein. In an embodiment, the WAN, WWAN, LAN, and WLAN may each include an access point 138 or base station 140 used to operatively couple the information handling system 100 to a network 136. In a specific embodiment, the network 136 may include macro-cellular connections via one or more base stations 138 or a wireless access point 138 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 128 may include one or more radio frequency (RF) subsystems (e.g., radio 130-1, 130-2) with transmitter/receiver circuitry, modem circuitry, one or more antenna front end circuits 132, one or more wireless controller circuits, amplifiers, antennas 134-1, 134-2 and other circuitry of the radio 130-1, 130-2 such as one or more antenna ports used for wireless communications via multiple radio access technologies (RATs). The radio 130-1, 130-2 may communicate with one or more wireless technology protocols. In one embodiment, the radio 130-1 operating as a WWAN module may contain individual subscriber identity module (SIM) profiles for each technology service provider and their available protocols for any operating subscriber-based radio access technologies such as cellular LTE communications. It is appreciated that the radios 130-1, 130-2 may be any type of wireless module operatively coupled to the RF front end 132 via, for example, I2C lines. These modules forming the radios 130-1, 130-2 include a WWAN module (e.g., radio 130-1), a WLAN module, a Bluetooth module (e.g., 130-2) or any other wireless protocol module used to operatively couple the information handling system 100 to a network or to the wireless peripheral device 186 or other wireless peripheral device 186 as described herein. It is appreciated that the backend management server 170 may also include a wireless interface adapter and radios similar to those of the information handling system 100 shown as well as wired network interface devices in order to allow for the information handling system 100 to be operatively coupled to the backend management server 170 as described herein.

In an example embodiment, the wireless interface adapter 128, radio 130-1, 130-2, and antenna 134-1, 134-2 may provide connectivity to one or more of the wireless peripheral devices 142, 186 that may include a wireless video display device 144, a wireless keyboard 146, a wireless mouse 152, a wireless headset, a microphone, a wireless stylus 148, and a wireless trackpad 150, among other wireless peripheral devices used as input/output (I/O) devices 142. For purposes of the present specification, the wireless peripheral device 186 is used as an example wireless peripheral device and may include any type of peripheral device of the wireless input/output devices 142 shown in FIG. 1.

It is appreciated that the various radios 130-1, 130-2 shown in FIG. 1 may be each coupled to an antenna 134-1, 134-2 via the RF front end 132. In an embodiment, the wireless interface adapter 128 may include any number of antennas 134-1, 134-2 which may include any number of tunable antennas for use with the system and methods disclosed herein. Although FIG. 1 shows two antennas 134-1, 134-2, the present specification contemplates that the number of antennas 134-1, 134-2 may include more or less of the number of individual antennas shown in FIG. 1. Additional antenna system modification circuitry (not shown) may also be included with the wireless interface adapter 128 to implement coexistence control measures via an antenna controller in various embodiments of the present disclosure.

In some aspects of the present disclosure, the wireless interface adapter 128 may operate two or more wireless links. In an embodiment, the wireless interface adapter 128 may operate a Bluetooth® wireless link (e.g., via Bluetooth radio 130-2 and antenna 134-2) using a Bluetooth® wireless or Bluetooth® Low Energy (BLE). In an embodiment, the Bluetooth® wireless protocol may operate at frequencies between 2.402 to 2.48 GHZ.

The wireless interface adapter 128 may operate in accordance with any wireless data communication standards. To communicate with a wireless local area network, for example, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums.

The wireless interface adapter 128 can represent an add-in card, a wired network interface, or a wireless network interface module that is integrated with a main board of the information handling system 100 (and backend management server 170 in embodiments herein) or integrated with another wireless network interface capability, wired network interface capability, or any combination thereof. As described herein, a network interface device may include a wireless interface adapter 128 or a wired network interface card. In an embodiment the wireless interface adapter 128 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 130-1, 130-2 include wireless controllers to manage authentication, connectivity, communications, power levels for transmission, buffering, error correction, baseband processing, and other functions of the wireless interface adapter 128.

As described herein, the backend management server database 172 may be an entity that includes a root device identifier composition engine (DICE) certificate. This root DICE certificate may establish a root of trust between the backend management server 170 (e.g., as the source of trust) with any device that has a DICE certificate signed by the root DICE certificate. In an embodiment, this root DICE certificate may be used to sign a factory server certificate or, in the example embodiment described herein, a certificate associated with the wireless peripheral device manufacturer 176. This intermediate certificate held by the wireless peripheral device manufacturer 176 and signed by the root DICE certificate at the backend management server 170 may be used to create a certificate chain in some embodiments herein. In an embodiment, the intermediate certificate held by the wireless peripheral device manufacturer 176 and signed by the backend management server 170 may be used to establish a device identity of the wireless peripheral device 186 and may also include or be associated with a PD ID 168. As such, the use of the DICE certificate generated for each wireless peripheral device 186 is used to identify a wireless peripheral device 186 when a pairing session has been initiated. In an embodiment, the intermediate DICE certificate is used to create a DICE certificate over a public key that corresponds to a private key created at the wireless peripheral device 186 by the wireless peripheral device manufacturer 176 and stored on a memory device thereon. The DICE certificate over a public key created by the wireless peripheral device manufacturer 176 for the wireless peripheral device 186 is also referred to at times herein just as a DICE certificate 194.

Additionally, a copy of the peripheral device DICE certificate 194 and a PD ID 168 (e.g., a serial number associated with the wireless peripheral device 186) is passed to the backend management server 170 to be correlated with the identification of the wireless peripheral device 186 (e.g., PD ID 168) with an identity of a user who purchased the wireless peripheral device 186 via purchaser information data. For example, the backend management server 170 may include a list of users/information handling systems 100 that match, for example, purchasing data or other user identification data such that the wireless peripheral device 186 and its DICE certificate 194 and PD ID 168 can be associated with that user and the user's information handling system 100. This correlation of DICE certificate 194, PD ID 168, and user identification with purchaser information may be stored on the backend management server database 172 for later retrieval.

By doing so, in an embodiment, the backend management server 170 may transmit the root DICE certificate to the user's information handling system being identified for later comparison with the DICE certificate 194 received from the wireless peripheral device 186. In an embodiment, the backend management server 170 may simply verify that the root DICE certificate has been received by the information handling system 100 because, in some example embodiments, the information handling system 100 may already have the root DICE certificate installed during manufacturing of the information handling system. The preinstallation of the root DICE certificate may be a result of the manufacture of the information handling system 100 and the operating entity of the backend management server 170 being the same entity (e.g., Dell®). The preinstallation of the root DICE certificate may be done in anticipation for the user to purchase a wireless peripheral device 186 from the wireless peripheral device manufacturer 176 who has engaged in a business relationship with the operating entity of the backend management server 170/manufacturer of the information handling system. The root DICE certificate may be stored on a certificate store or registry of the information handling system 100 such as Windows® Security Certificate Manager. It is appreciated that, in some embodiments described herein, a copy of the DICE certificate 194 is not sent to the backend management server 170 allowing the automatic querying, verification, and BT pairing of the wireless peripheral device 186 with the information handling system 100 to be conducted at the information handling system 100 offline using alternative systems and methods to do so.

As the backend management server 170 receives the copy of the DICE certificate 194 and as the information handling system 100 receives a copy of the root DICE certificate from the backend management server 170, the wireless peripheral device 186 may be packaged and shipped to the user's location. It is appreciated that the wireless peripheral device 186 may be purchased using any means such as via an ecommerce store or other purchasing methods. The user may provide purchasing and shipping instructions not only for the wireless peripheral device 186 to be shipped to the correct location but also to identify the user at the backend management server 170 as described herein. As the user receives the wireless peripheral device 186, the user may turn on the wireless peripheral device 186 to initiate one of several different types of Bluetooth® (BT) pairing methods described herein.

In an example embodiment, as the user powers on the wireless peripheral device 186, the wireless peripheral device 186 may broadcast a PD ID 168 to the information handling system 100. In an embodiment, transmissions between the wireless peripheral device 186 and the information handling system 100 may be conducted at initial phases of the embodiments herein using a generic attribute (GATT) profile transmission under the BLE standard. This GATT profile transmission may be conducted between two BLE devices such as the wireless peripheral device 186 and a BT radio 130-2 of the information handling system 100.

The inclusion of the PD ID 168 in the initial pairing request broadcast causes the information handling system 100 to initiate a callback to cause the information handling system 100 to request the backend management server 170 cross-reference the PD ID 168 received to those maintained on the backend management server database 172 in an embodiment. Where a matching PD ID 168 exists, correlated user and information handling system 100 data may be transmitted to the information handling system 100 as verification that the copy of the DICE certificate 194 matches the user and the PD ID 168. It is appreciated that data transmissions between the information handling system 100 and backend management server 170 may be carried out via a secure transmission protocol such as transport layer security (TLS) protocols that use cryptographic protocols to prevent man-in-the-middle attacks from third-party entities.

Once the PD ID 168 has been verified, the wireless peripheral device 186 may send a digest of the DICE certificate 194 to the information handling system 100 upon request from the information handling system 100. A digest of the DICE certificate 194 may include a hash version of the DICE certificate 194 in an embodiment. In an embodiment, therefore, the DICE certificate 194 is subjected to a hash algorithm to secure the data present in the DICE certificate 194 during transmission from the wireless peripheral device 352 and the information handling system 100 to verify the authenticity of the DICE certificate. The digest of the DICE certificate 194 may be sent to confirm the identity of the wireless peripheral device 186. At this point the digest of the DICE certificate 194 is checked against the root DICE certificate received earlier from the backend management server 170 by the information handling system 100. Where the root DICE certificate is not present for the DICE certificate 194, the BT pairing process is not completed.

Where the digest of the DICE certificate 194 can be verified via access to the root DICE certificate, the public key of the DICE certificate 194 may be extracted. As described herein, this public key 190 was included with the DICE certificate 194 while the wireless peripheral device 186 was with the wireless peripheral device manufacturer 176 and is associated with a private key held on the memory device of the wireless peripheral device 186.

After retrieving the public key 190 from the DICE certificate 194, a hardware processor (e.g., hardware processor 102, EC 104, GPU 154, etc.) at information handling system 100 may be used to execute computer readable program code of a OOB temporary key generator agent 184. Execution of the OOB temporary key generator agent 184 generates a OOB temporary key 166 used to securely verify and automatically pair the wireless peripheral device 186 with the information handling system 100. In an embodiment, the execution of the OOB temporary key generator agent 184 to create the OOB temporary key 166 may include the use of a random number generator (RNG) algorithm 188. The RNG algorithm 188, when executed by the OOB temporary key generator agent 184, may develop a set of random numbers that are unique to the pairing session between the wireless peripheral device 186 and information handling system 100 to generate a cryptographic key that is the OOB temporary key 166. It is appreciated as well that other types of number generators may be executed by the OOB temporary key generator agent 184 and the present specification contemplates the use of these other number generators.

In an embodiment, the OOB temporary key 166 may be stored on a secure memory location such as, for example, a unified extensible firmware interface (UEFI) memory location to secure the OOB temporary key 166 until used later for automatic verification and BT pairing. The OOB temporary key 166 may be stored as a UEFI variable in the UEFI memory location for later access by an operating system (OS) Bluetooth® (BT) stack (not shown).

In an embodiment, the hardware processor may execute computer readable program code of an automatic peripheral device pairing management system pairing agent 156 to encrypt or wrap the OOB temporary key 166 using the public key 190. This encryption of the OOB temporary key 166 using the public key 190 by the execution of the automatic peripheral device pairing management system pairing agent 156 creates a public key-encrypted OOB temporary key 198 at the information handling system 100 to secure sharing the OOB temporary key 166 with the wireless peripheral device 186. In an embodiment, the automatic peripheral device pairing management system pairing agent 156 may execute any type of public-key cryptography. In a particular embodiment, the automatic peripheral device pairing management system pairing agent 156 executes a Rivet-Shamir-Adleman (RSA) public key cryptographic algorithm to encrypt or wrap the generated OOB temporary key 166 as the public key-encrypted OOB temporary key 166 for transmission to the wireless peripheral device 186.

At this point, the public key-encrypted OOB temporary key 198 is transmitted to the wireless peripheral device 186 using the GATT profile transmission described herein. Again, because wireless peripheral device 186 included the private key 196 and was the only source of the private key 196, only the wireless peripheral device 186 can decrypt the public key-encrypted OOB temporary key 198. In an embodiment, a microcontroller or other hardware processor may execute a decrypting agent 192 to, with the private key 196, decrypt the public key-encrypted OOB temporary key 198 to retrieve the OOB temporary key 166 at the wireless peripheral device 186.

In an embodiment, both the information handling system 100 and the wireless peripheral device 186 each have a copy of the OOB temporary key 166 to continue the pairing process. Again, the information handling system 100 may store one generated copy of the OOB temporary key 166 in UEFI memory device 160 as UEFI variable data 162 or store the OOB temporary key 166 in other secure memory locations in various memory devices in various embodiments. The UEFI memory device 160 on the information handling system 100 may be any memory device that maintains the OOB temporary key 166 for later retrieval by an operating system (OS) Bluetooth® (BT) stack (e.g., 372, FIG. 3) under direction of a hardware processor (e.g., hardware processor 102) in one embodiment. In an embodiment, the UEFI variable data 162 is stored on a flash memory device associated with the basic input/output system (BIOS) 114.

In an embodiment, the OS BT stack includes computer executable program code with hardware that, when executed by a hardware processor (e.g., hardware processor 102, embedded controller 104, or any other hardware processing resource) along with code instructions of the automatic peripheral device pairing management system pairing agent 156 of the information handling system 100, performs automatic querying, verification, and initiation of BT pairing operations between the information handling system 100 and wireless peripheral device 186, and controls operations of a Bluetooth radio 130-2 under any BT protocols, among other functions. A plurality of protocols may be present in the Bluetooth stack which may include core protocols including Bluetooth radio, baseband, link manage protocol, logical link control and adaptation protocol, and service discovery protocols. Further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio 130-2) used to transmit radio waves at a specific frequency as described herein. The frequency with which the Bluetooth stack of the Bluetooth radio 130-2 queries the UEFI variable data 162 to determine if OOB temporary key 166 and PD ID 168 data is available may vary. In an embodiment, the Bluetooth stack may query the UEFI memory device 160 for the UEFI variable data 162 during every power up of the information handling system 100. In an embodiment, the Bluetooth stack may query the UEFI variable data 162 on the UEFI memory device 160 a plurality of times when the information handling system 100 is powered up.

After decrypting the public key-encrypted OOB temporary key 198, the wireless peripheral device 186 broadcasts the PD ID 168 via, for example, an OOB BT broadcast pairing query. That broadcasting indicates the availability of the wireless peripheral device 186 to continue the pairing process with the information handling system 100. In an embodiment, this broadcast includes a pairing request to the information handling system 100 to BT pair with the wireless peripheral device 186. In the embodiments herein, the OS BT stack associated with the Bluetooth radio 130-2 may detect this PD ID 168 and, via execution of code instructions of the automatic peripheral device pairing management system pairing agent 156 of the information handling system 100, compare it to the PD ID 168 stored on the UEFI memory device.

Where the PD ID 168 provided by the wireless peripheral device 186 does not match the PD ID 168 accessed by the Bluetooth stack of the Bluetooth radio 130-2, the pairing process is not completed. Where the broadcasted PD ID 168 provided by the wireless peripheral device 186 matches the PD ID 168 stored in the UEFI memory device 160, the automatic verification and initiation of BT pairing process may proceed via execution of code instructions of the automatic peripheral device pairing management system pairing agent 156.

In an embodiment, the Bluetooth stack of the Bluetooth radio 130-2 may request certain received signal strength indicator (RSSI) data signal (e.g., 335, FIG. 3) from the wireless peripheral device 186. RSSI data signal is received by the BT radio 130-2 of the information handling system 100 and the power level being received from the radio at the wireless peripheral device 186 (e.g., after calculated antenna and cable loss) can be determined. RSSI threshold data received by the wireless interface adapter of the information handling system 100 indicates whether, in an embodiment, the wireless peripheral device 186 is within a threshold range of the information handling system 100. In an embodiment where multiple wireless peripheral devices 186 are activated near the information handling system 100, the RSSI threshold may prevent other wireless peripheral devices 186 that are not within a threshold distance of the user's information handling system 100 from initiating automatic BT pairing. The RSSI power level provided by the wireless peripheral device 186 may be compared to an RSSI threshold value set at the Bluetooth radio 130-2 of the information handling system 100. Where the wireless peripheral device 186 RSSI value does not meet or exceed the RSSI threshold value, the information handling system 100 may ignore the pairing request of the wireless peripheral device 186. Where the RSSI value meets or exceeds the RSSI threshold value, the OS BT stack of the Bluetooth radio 130-2 within the information handling system 100 may continue the automatic verification and initiation of BT pairing process to establish a BT wireless link.

The automatic verification and initiation of the BT pairing process, in an embodiment, is executed by code instructions of the automatic peripheral device pairing management system pairing agent 156 of the information handling system 100 and includes the information handling system 100 verifying that the OOB temporary key 166 matches the OOB temporary key 166 now stored at the wireless peripheral device 186 attempting to BT pair with the information handling system 100. This may be done with a process where the OOB temporary key 166 is used to encrypt a message or data generated at the information handling system 100 and sent to the wireless peripheral device 186. At the wireless peripheral device 186, the OOB temporary key 166 is used to decrypt the message and message or value is generated at the wireless peripheral device 186 suing the same value generator function for comparison. Further that message is encrypted and sent to the information handling system 100 and decrypted in the reverse between the wireless peripheral device 186 and the information handling system 100 for comparison as well. This exchange of message values encrypted and decrypted at both sides of the BT pairing may be conducted according to a confirm value generation function in various embodiments. With such encryption and decryption if the messages match, the OOB temporary key 166 and OOB temporary key 166 on the wireless peripheral device 186 may be verified as matching in one example embodiment and thus indicates that the wireless peripheral device 186 and the information handling system 100 are assigned and are to be paired with one another. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 186 to the information handling system 100 and set up a BT wireless link with a session key. In an embodiment, the information handling system 100 and wireless peripheral device 186 can each provide various automatic querying, verification, and BT pairing communications that includes the OOB temporary key 166 verification and a pairing response command via an OOB BT communication prior to establishing a BT wireless link with a secure session key under any of the BT standards.

In a particular example embodiment, the information handling system 100 may generate using a value generator function and encrypt an Mconfirm value from its copy of the OOB temporary key 166 via an encryption algorithm, provide encrypted Mconfirm to the wireless peripheral device 186, for decryption at the wireless peripheral device 186 its own stored copy of the OOB temporary key 166. Further, the wireless peripheral device 186 may use a similar value generator function to generate an Sconfirm value for comparison and use its copy of the OOB temporary key 166 to encrypt it at the wireless peripheral device 186 and send it to the information handling system 100. The sent Sconfirm value is encrypted using the OOB temporary key 166 there to determine the sent Sconfirm value. A match of the received Sconfirm from the wireless peripheral device 186 with the Mconfirm from the information handling system 100 may be used as verification in such an example embodiment. Where the values match, the BT pairing process establishes a session key and a BT wireless link via the OS BT stack and BT protocols. Then the BT pairing process is completed between the wireless peripheral device 186 and information handling system 100. In an embodiment, once the wireless peripheral device 186 is paired with the information handling system 100, the OOB temporary key 166 is no longer used and the OOB temporary key 166 on both the information handling system 100 and the wireless peripheral device 186 may be deleted. Thus, in an embodiment, the OOB temporary key 166 may be a single use temporary key in some embodiments and is therefore ephemeral in that it is exposed and transmitted as needed and deleted afterward.

In another example embodiment, as the user powers on the wireless peripheral device 186, the wireless peripheral device 186 may broadcast a PD ID 168 to the information handling system 100. Again, transmissions between the wireless peripheral device 186 and the information handling system 100 may be conducted using the GATT profile transmission. The inclusion of the PD ID 168 in the broadcast causes the information handling system 100 to initiate a callback to cause the information handling system 100 to confirm the identity of the wireless peripheral device 186. Along with this initial transmission of the PD ID 168, the wireless peripheral device 186 may transmit the DICE certificate via the GATT profile transmission. Although the DICE certificate 194 includes a public key 190, no other entity apart from the wireless peripheral device 186 (which holds the private key) can access information to prevent access by third-party entities during man-in-the-middle attacks. At this point the DICE certificate 194 is checked against the root DICE certificate received from the backend management server 170 by the information handling system 100 either while the information handling system 100 was connected to the backend management server 170 via the network 136 or during manufacture of the information handling system 100. Where the root DICE certificate is not present for the DICE certificate 194, the BT pairing process is not completed. Where the DICE certificate 194 can be verified via access to the root DICE certificate, the public key of the DICE certificate 194 may be extracted. As described herein, this public key 190 was included with the DICE certificate 194 while the wireless peripheral device 186 was with the wireless peripheral device manufacturer 176, and is associated with a private key held on the memory device of the wireless peripheral device 186.

After retrieving the public key 190 from the DICE certificate 194, a hardware processor (e.g., hardware processor 102, EC 104, GPU 154, etc.) may be used to execute computer readable program code of a OOB temporary key generator agent 184. Execution of the OOB temporary key generator agent 184 generates a OOB temporary key 166 used to securely verify and automatically pair the wireless peripheral device 186 with the information handling system 100. In an embodiment, the execution of the OOB temporary key generator agent 184 to create the OOB temporary key 166 may include the use of a random number generator (RNG) algorithm 188. The RNG algorithm 188, when executed by the OOB temporary key generator agent 184, may develop a set of random numbers that are unique to the pairing session between the wireless peripheral device 186 and information handling system 100. It is appreciated as well that other types of number generators may be executed by the OOB temporary key generator agent 184 and the present specification contemplates the use of these other number generators.

In an embodiment, one copy of the OOB temporary key 166 may be stored on a secure memory location such as, for example, a unified extensible firmware interface (UEFI) memory location to secure the OOB temporary key 166 until used later. The OOB temporary key 166 may be stored as a UEFI variable in the UEFI memory location for later access by an operating system (OS) Bluetooth® (BT) stack (not shown).

In an embodiment, the hardware processor may execute computer readable program code of an automatic peripheral device pairing management system pairing agent 156 to encrypt or wrap another copy of the OOB temporary key 166 using the public key 190. This encryption of the OOB temporary key 166 using the public key 190 by the execution of the automatic peripheral device pairing management system pairing agent 156 creates a public key-encrypted OOB temporary key 198 at the information handling system 100. In an embodiment, the automatic peripheral device pairing management system pairing agent 156 may execute any type of public-key cryptography. In a particular embodiment, the automatic peripheral device pairing management system pairing agent 156 executes a Rivet-Shamir-Adleman (RSA) public key cryptographic algorithm to encrypt or wrap the generated OOB temporary key 166 as the public key-encrypted OOB temporary key 166 for transmission to the wireless peripheral device 186.

At this point, the public key-encrypted OOB temporary key 198 is transmitted to the wireless peripheral device 186 using the GATT profile transmission described herein. Again, because wireless peripheral device 186 included the private key 196 and was the only source of the private key 196, only the wireless peripheral device 186 can decrypt the public key-encrypted OOB temporary key 198. In an embodiment, a microcontroller or other hardware processor may execute a decrypting agent 192 to, with the private key 196, decrypt the public key-encrypted OOB temporary key 198 to retrieve the OOB temporary key 166.

In an embodiment, both the information handling system 100 and the wireless peripheral device 186 each have a copy of the OOB temporary key 166 to continue the pairing process. Again, the information handling system 100 may store its copy of the OOB temporary key 166 UEFI memory device 160 as UEFI variable data 162 or store the OOB temporary key 166 in other secure memory locations in various memory devices in various embodiments. The UEFI memory device 160 on the information handling system 100 may be any memory device that maintains the OOB temporary key 166 for later retrieval by an operating system (OS) Bluetooth® (BT) stack (e.g., 472, FIG. 4) under direction of a hardware processor (e.g., hardware processor 102) in one embodiment. In an embodiment, the UEFI variable data 162 is stored on a flash memory device associated with the basic input/output system (BIOS) 114.

In an embodiment, the OS BT stack includes computer executable program code with hardware that, when executed by a hardware processor (e.g., hardware processor 102, embedded controller 104, or any other hardware processing resource) along with code instructions of the automatic peripheral device pairing management system pairing agent 156 of the information handling system 100, performs automatic querying, verification, and initiation of BT pairing operations between the information handling system 100 and wireless peripheral device 186, and controls operations of a Bluetooth radio 130-2 under any BT protocols, among other functions. A plurality of protocols may be present in the Bluetooth stack which may include core protocols including Bluetooth radio, baseband, link manage protocol, logical link control and adaptation protocol, and service discovery protocols. Further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio 130-2) used to transmit radio waves at a specific frequency as described herein. The frequency with which the Bluetooth stack of the Bluetooth radio 130-2 queries the UEFI variable data 162 to determine if OOB temporary key 166 and PD ID 168 data is available may vary. In an embodiment, the Bluetooth stack may query the UEFI memory device 160 for the UEFI variable data 162 during every power up of the information handling system 100. In an embodiment, the Bluetooth stack may query the UEFI variable data 162 on the UEFI memory device 160 a plurality of times when the information handling system 100 is powered up.

After decrypting the public key-encrypted OOB temporary key 198, the wireless peripheral device 186 broadcasts the PD ID 168 via, for example, an OOB BT broadcast. That broadcasting indicates the availability of the wireless peripheral device 186 to continue the pairing process with the information handling system 100. In an embodiment, this broadcast includes a pairing request to the information handling system 100 to BT pair with the wireless peripheral device 186. In the embodiments herein, the OS BT stack associated with the Bluetooth radio 130-2 may detect this PD ID 168 and, via execution of code instructions of the automatic peripheral device pairing management system pairing agent 156 of the information handling system 100, compare it to the PD ID 168 stored on the UEFI memory device.

Where the PD ID 168 provided by the wireless peripheral device 186 does not match the PD ID 168 accessed by the Bluetooth stack of the Bluetooth radio 130-2, the pairing process is not completed. Where the broadcasted PD ID 168 provided by the wireless peripheral device 186 matches the PD ID 168 stored in the UEFI memory device 160, the automatic verification and initiation of BT pairing process may proceed via execution of code instructions of the automatic peripheral device pairing management system pairing agent 156.

In an embodiment, the Bluetooth stack of the Bluetooth radio 130-2 may request certain received signal strength indicator (RSSI) data signal (e.g., 435, FIG. 4) from the wireless peripheral device 186. RSSI data signal is received by the BT radio 130-2 of the information handling system 100 and the power level being received from the radio at the wireless peripheral device 186 (e.g., after calculated antenna and cable loss) can be determined. RSSI threshold data received by the wireless interface adapter of the information handling system 100 indicates whether, in an embodiment, the wireless peripheral device 186 is within a threshold range of the information handling system 100. In an embodiment where multiple wireless peripheral devices 186 are activated near the information handling system 100, the RSSI threshold may prevent other wireless peripheral devices 186 that are not within a threshold distance of the user's information handling system 100 from initiating automatic BT pairing. The RSSI power level provided by the wireless peripheral device 186 may be compared to an RSSI threshold value set at the Bluetooth radio 130-2 of the information handling system 100. Where the wireless peripheral device 186 RSSI value does not meet or exceed the RSSI threshold value, the information handling system 100 may ignore the pairing request of the wireless peripheral device 186. Where the RSSI value meets or exceeds the RSSI threshold value, the OS BT stack of the Bluetooth radio 130-2 within the information handling system 100 may continue the automatic verification and initiation of BT pairing process to establish a BT wireless link.

The automatic verification and initiation of the BT pairing process, in an embodiment, is executed by code instructions of the automatic peripheral device pairing management system pairing agent 156 of the information handling system 100 and includes the information handling system 100 verifying that the OOB temporary key 166 matches the OOB temporary key 166 now stored at the wireless peripheral device 186 attempting to BT pair with the information handling system 100. This may be done with a process where the OOB temporary key 166 is used to encrypt a message or data sent to the wireless peripheral device 186 and the OOB temporary key 166 is used to decrypt the message and a message is encrypted and decrypted in the reverse between the wireless peripheral device 186 and the information handling system 100 as well. This exchange of message values encrypted and decrypted at both sides of the BT pairing may be conducted according to a confirm value generation function in various embodiments. With such encryption and decryption if the messages match, the OOB temporary key 166 and OOB temporary key 166 on the wireless peripheral device 186 may be verified as matching in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 186 to the information handling system 100 and set up a BT wireless link with a session key. In an embodiment, the information handling system 100 and wireless peripheral device 186 can each provide various automatic querying, verification, and BT pairing communications that includes the OOB temporary key 166 verification and a pairing response command via an OOB BT communication prior to establishing a BT wireless link with a secure session key under any of the BT standards.

In an example embodiment, the information handling system 100 may generate with a value generator function and encrypt an Mconfirm value from its copy of the OOB temporary key 166 via an encryption algorithm, and provide the encrypted Mconfirm to the wireless peripheral device 186. The Mconfirm is decrypted at the wireless peripheral device 186 with its own stored copy of the OOB temporary key 166. Further, the wireless peripheral device generated Sconfirm value may also be generated similarly with a value generator function and then encrypt it at the wireless peripheral device 186 using its copy of the OOB temporary key 166 and send it to the information handling system 100 for decryption using the OOB temporary key 166 there to determine the sent Sconfirm value. A match of the received Sconfirm from the wireless peripheral device 186 with the Mconfirm from the information handling system 100 may be used as verification in such an example embodiment. Where the values match, the BT pairing process establishes a session key and a BT wireless link via the OS BT stack and BT protocols. Then the BT pairing process is completed between the wireless peripheral device 186 and information handling system 100. In an embodiment, once the wireless peripheral device 186 is paired with the information handling system 100, the OOB temporary key 166 is no longer used and the OOB temporary key 166 on both the information handling system 100 and the wireless peripheral device 186 may be deleted. Thus, in an embodiment, the OOB temporary key 166 may be a single use temporary key in some embodiments.

In yet another example embodiment, as the user powers on the wireless peripheral device 186, the wireless peripheral device 186 may broadcast a PD ID 168 to the information handling system 100. Again, transmissions between the wireless peripheral device 186 and the information handling system 100 may be conducted using a GATT profile transmission. The inclusion of the PD ID 168 in the broadcast causes the information handling system 100 to initiate a callback to cause the information handling system 100 to, similar to other embodiments herein, request the backend management server 170 cross-reference the PD ID 168 received to those maintained on the backend management server database 172. Where a matching PD ID 168 exists, correlated user and information handling system 100 data may be transmitted to the information handling system 100 along with a copy of the DICE certificate 194 associated with the user and the information handling system 100 by the backend management server 170 as verification that the copy of the DICE certificate 194 matches the user and the PD ID 168. It is appreciated that data transmissions between the information handling system 100 and backend management server 170 may be carried out via a secure transmission protocol such as transport layer security (TLS) protocols that use cryptographic protocols to prevent man-in-the-middle attacks from third-party entities.

Once the PD ID 168 has been verified, the information handling system 100 engages in a security protocol and data model (SPDM) binding to Bluetooth® protocol to initiate a private communication channel over Bluetooth®. In an embodiment, this includes utilizing a Diffie-Hellman algorithm to create a tunnel over which a generated OOB temporary key 166 may be transmitted from the information handling system 100 to the wireless peripheral device 186. The SPDM binding to BT protocol includes the information handling system 100 requesting a version of the wireless peripheral device 186 and the wireless peripheral device 186 responding with its version. The SPDM binding to BT protocol further includes the information handling system 100 requesting hardware and software capabilities of the device with the wireless peripheral device 186 responding with data describing those capabilities of the wireless peripheral device 186. Still further, the SPDM binding to BT protocol includes negotiating which algorithm to use to create the Diffie-Hellman communication tunnel with the wireless peripheral device 186 returning data describing the appropriate algorithm to use. Even further, the SPDM binding to BT protocol includes, in the present specification, a request from the information handling system 100 to the wireless peripheral device 186 for the DICE certificate 194 maintained on the memory device of the wireless peripheral device 186. The wireless peripheral device 186 then sends the DICE certificate 194 to the information handling system 100.

At this point, the information handling system 100 may compare the DICE certificate 194 received over the SPDM binding to BT protocol communication channel to the DICE certificate 194 received from the backend management server 170. Where the DICE certificates 194 do not match, the pairing process is terminated. Where they do match, the SPDM binding to BT protocol continues with the information handling system 100 exchanging encryption session keys to create an encrypted session.

Once the encrypted session has been created, a hardware processor (e.g., hardware processor 102, EC 104, GPU 154, etc.) may be used to execute computer readable program code of a OOB temporary key generator agent 184. Execution of the OOB temporary key generator agent 184 generates copies of a OOB temporary key 166 used to securely pair the wireless peripheral device 186 with the information handling system 100. In an embodiment, the execution of the OOB temporary key generator agent 184 to create the OOB temporary key 166 may include the use of a random number generator (RNG) algorithm 188. The RNG algorithm 188, when executed by the OOB temporary key generator agent 184, may develop a set of random numbers that are unique to the pairing session between the wireless peripheral device 186 and information handling system 100. It is appreciated as well that other types of number generators may be executed by the OOB temporary key generator agent 184 and the present specification contemplates the use of these other number generators.

In an embodiment, a copy of the OOB temporary key 166 may be stored on a secure memory location such as, for example, a unified extensible firmware interface (UEFI) memory location to secure the OOB temporary key 166 until used later. The OOB temporary key 166 may be stored as a UEFI variable in the UEFI memory location for later access by an operating system (OS) Bluetooth® (BT) stack (not shown).

At this point, another OOB temporary key 166 is transmitted to the wireless peripheral device 186 using the SPDM binding to BT protocol described herein. In an embodiment, a copy of the OOB temporary key 166 OOB temporary key 166 is sent, via this secure communication channel, to the wireless peripheral device 186 for automatic comparison between the information handling system 100 and wireless peripheral device 186.

In an embodiment, both the information handling system 100 and the wireless peripheral device 186 each have a copy of the OOB temporary key 166 to continue the pairing process. Again, the information handling system 100 may store the OOB temporary key 166 UEFI memory device 160 as UEFI variable data 162 or store the OOB temporary key 166 in other secure memory locations in various memory devices in various embodiments. The UEFI memory device 160 on the information handling system 100 may be any memory device that maintains the OOB temporary key 166 for later retrieval by an operating system (OS) Bluetooth® (BT) stack (e.g., 572, FIG. 5) under direction of a hardware processor (e.g., hardware processor 102) in one embodiment. In an embodiment, the UEFI variable data 162 is stored on a flash memory device associated with the basic input/output system (BIOS) 114.

In an embodiment, the OS BT stack includes computer executable program code with hardware that, when executed by a hardware processor (e.g., hardware processor 102, embedded controller 104, or any other hardware processing resource) along with code instructions of the automatic peripheral device pairing management system pairing agent 156 of the information handling system 100, performs automatic querying, verification, and initiation of BT pairing operations between the information handling system 100 and wireless peripheral device 186, and controls operations of a Bluetooth radio 130-2 under any BT protocols, among other functions. A plurality of protocols may be present in the Bluetooth stack which may include core protocols including Bluetooth radio, baseband, link manage protocol, logical link control and adaptation protocol, and service discovery protocols. Further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio 130-2) used to transmit radio waves at a specific frequency as described herein. The frequency with which the Bluetooth stack of the Bluetooth radio 130-2 queries the UEFI variable data 162 to determine if OOB temporary key 166 and PD ID 168 data is available may vary. In an embodiment, the Bluetooth stack may query the UEFI memory device 160 for the UEFI variable data 162 during every power up of the information handling system 100. In an embodiment, the Bluetooth stack may query the UEFI variable data 162 on the UEFI memory device 160 a plurality of times when the information handling system 100 is powered up.

Where the PD ID 168 provided by the wireless peripheral device 186 does not match the PD ID 168 accessed by the Bluetooth stack of the Bluetooth radio 130-2, the pairing process is not completed. Where the broadcasted PD ID 168 provided by the wireless peripheral device 186 matches the PD ID 168 stored in the UEFI memory device 160, the automatic verification and initiation of BT pairing process may proceed via execution of code instructions of the automatic peripheral device pairing management system pairing agent 156.

In an embodiment, the Bluetooth stack of the Bluetooth radio 130-2 may request certain received signal strength indicator (RSSI) data signal (e.g., 535, FIG. 5) from the wireless peripheral device 186. RSSI data signal is received by the BT radio 130-2 of the information handling system 100 and the power level being received from the radio at the wireless peripheral device 186 (e.g., after calculated antenna and cable loss) can be determined. RSSI threshold data received by the wireless interface adapter of the information handling system 100 indicates whether, in an embodiment, the wireless peripheral device 186 is within a threshold range of the information handling system 100. In an embodiment where multiple wireless peripheral devices 186 are activated near the information handling system 100, the RSSI threshold may prevent other wireless peripheral devices 186 that are not within a threshold distance of the user's information handling system 100 from initiating automatic BT pairing. The RSSI power level provided by the wireless peripheral device 186 may be compared to an RSSI threshold value set at the Bluetooth radio 130-2 of the information handling system 100. Where the wireless peripheral device 186 RSSI value does not meet or exceed the RSSI threshold value, the information handling system 100 may ignore the pairing request of the wireless peripheral device 186. Where the RSSI value meets or exceeds the RSSI threshold value, the OS BT stack of the Bluetooth radio 130-2 within the information handling system 100 may continue the automatic verification and initiation of BT pairing process to establish a BT wireless link.

The automatic verification and initiation of the BT pairing process, in an embodiment, is executed by code instructions of the automatic peripheral device pairing management system pairing agent 156 of the information handling system 100 and includes the information handling system 100 verifying that the OOB temporary key 166 matches the OOB temporary key 166 now stored at the wireless peripheral device 186 attempting to BT pair with the information handling system 100. This may be done with a process where the OOB temporary key 166 is used to encrypt a message or data sent to the wireless peripheral device 186 and the OOB temporary key 166 is used to decrypt the message and a message is encrypted and decrypted in the reverse between the wireless peripheral device 186 and the information handling system 100 as well. This exchange of message values encrypted and decrypted at both sides of the BT pairing may be conducted according to a confirm value generation function in various embodiments. With such encryption and decryption if the messages match, the OOB temporary key 166 and OOB temporary key 166 on the wireless peripheral device 186 may be verified as matching in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 186 to the information handling system 100 and set up a BT wireless link with a session key. In an embodiment, the information handling system 100 and wireless peripheral device 186 can each provide various automatic querying, verification, and BT pairing communications that includes the OOB temporary key 166 verification and a pairing response command via an OOB BT communication prior to establishing a BT wireless link with a secure session key under any of the BT standards.

In an example embodiment, the information handling system 100 may generate with a confirm value generator function and encrypt an Mconfirm value from its copy of the OOB temporary key 166 via an encryption algorithm, provide encrypted Mconfirm to the wireless peripheral device 186, for decryption at the wireless peripheral device 186 its own stored copy of the OOB temporary key 166. Further, the wireless peripheral device 186 may use the same confirm value generator to generate and Sconfirm value and encrypt the Sconfirm value for comparison to the Mconfirm and encrypt the Sconfirm value with its copy of the OOB temporary key 166 at the wireless peripheral device 186. The encrypted Sconfirm is and sent to the information handling system 100 for decryption using the OOB temporary key 166 to determine the sent Sconfirm value. A match of the received Sconfirm from the wireless peripheral device 186 with the Mconfirm from the information handling system 100 may be used as verification in such an example embodiment. Where the values match, the BT pairing process establishes a session key and a BT wireless link via the OS BT stack and BT protocols. Then the BT pairing process is completed between the wireless peripheral device 186 and information handling system 100. In an embodiment, once the wireless peripheral device 186 is paired with the information handling system 100, the OOB temporary key 166 is no longer used and the OOB temporary key 166 on both the information handling system 100 and the wireless peripheral device 186 may be deleted. Thus, in an embodiment, the OOB temporary key 166 may be a single use temporary key in some embodiments.

The systems and methods described herein allow for a secure system and method of BT pairing a wireless peripheral device 186. The information handling system 100 may generate its own OOB temporary key 166, on-the-fly either online or offline in order to securely and automatically query, verify, and BT pair an information handling system 100 to a wireless peripheral device 186. For example, because the wireless peripheral device 186 is the only entity that holds a private key that matches the public key of the DICE certificate 194, presentation of a public key-encrypted OOB temporary key 198 to the wireless peripheral device 186 will securely allow the wireless peripheral device 186 to BT pair with the information handling system 100 in some embodiments. Where a private key is not used, a device certificate may be accessed by the information handling system 100 from a backend management server 170 and the wireless peripheral device 186 concurrently over a secure communication channel using SPDM binding to BT protocol so that such an encrypted communication channel may secure data transmitted to and from the wireless peripheral device 186.

In an embodiment, the information handling system 100 and/or the backend management server 170 can include one or more sets of machine-readable code instructions, parameters, and profiles 112 that can be executed to cause the computer system to perform any one or more of the methods or computer-based functions disclosed herein. For example, machine-readable code instructions, parameters, and profiles 112 may execute, via hardware processing resources, various software applications, software agents, the BIOS 114 firmware and/or software, or other aspects or components. Machine-readable code instructions, parameters, and profiles 112 may execute, via the information handling system 100, the automatic peripheral device pairing management system pairing agent 156 which controls the generation of OOB temporary key 166 and/or public key-encrypted OOB temporary key 198 for verification and pairing with the wireless peripheral device 186. Still further, machine-readable code instructions, parameters, and profiles 112 may execute, via the hardware processor 102, EC 104, or any other hardware processing device, the OOB temporary key generator agent 184 which generates the OOB temporary key 166 for the information handling system 100 to automatically query, verify, and initiate BT pairing of wireless peripheral device 186 to the information handling system 100 as described herein. Again, the machine-readable code instructions, parameters, and profiles 112 described herein may be stored on a non-volatile memory device and made accessible to the EC 104, the hardware processor 104, a microcontroller unit (MCU), or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

In an embodiment, the disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 and/or the backend management server 170 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102, and other hardware components described herein. The PMU 122 may control power to one or more components including the one or more drive units 120, the hardware processor 102 (e.g., CPU), the EC 104, the GPU 154, a video/graphic display device 144 or other wired input/output devices 142 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the information handling system 100 and/or the backend management server 170 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the information handling system 100 and/or the backend management server 170, via a wired connections as applicable, or when AC power from the AC power adapter 126 is removed. PMU 122 may include a hardware controller to operate with the EC 104 separately or together to execute machine-readable code instructions, parameters, and profiles 112 of the automatic peripheral device pairing management system pairing agent 156 at the information handling system 100 and the automatic PD pairing management system pairing agent 156 at the information handling system 100 as described herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, ARM® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
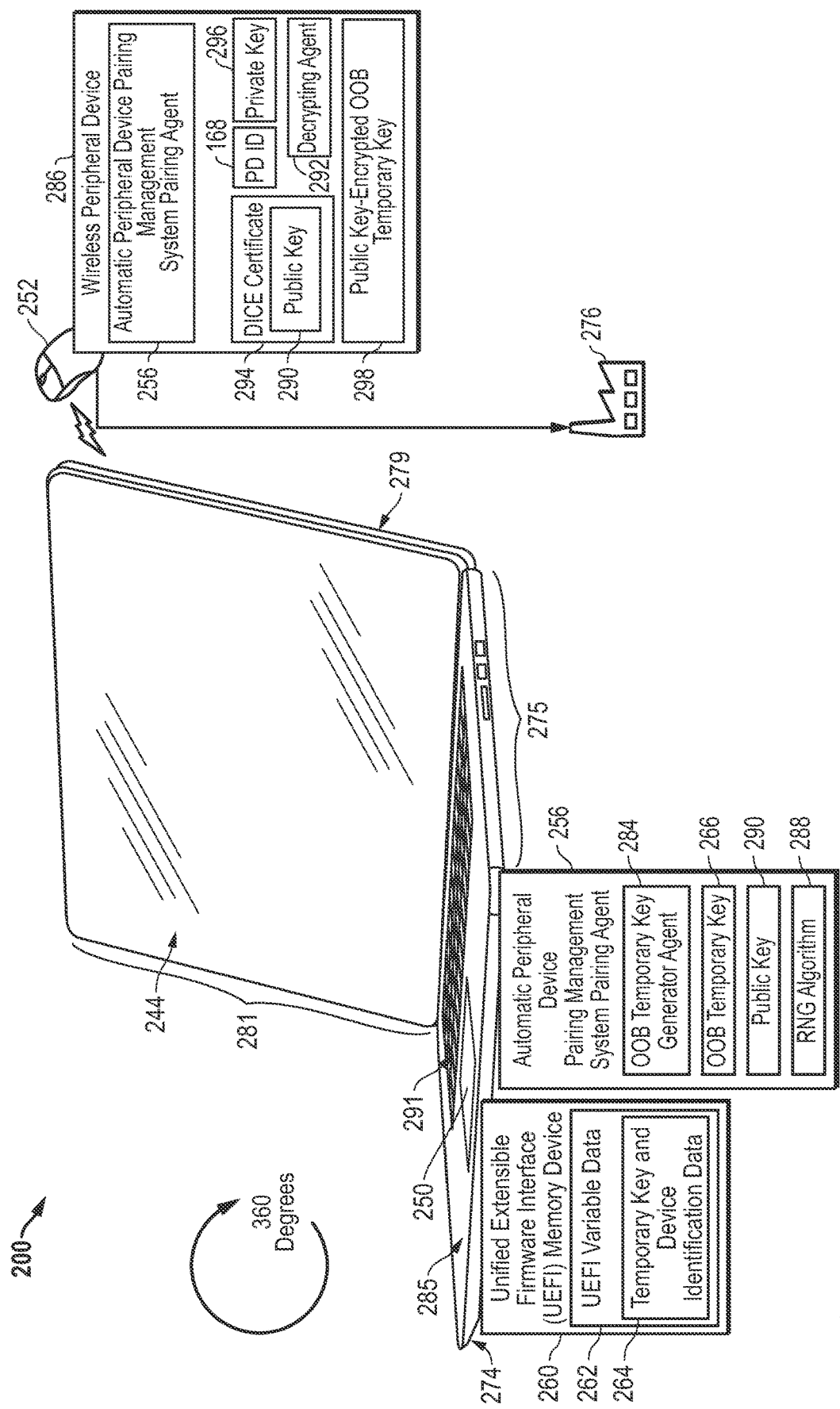
FIG. 2 is a graphic diagram of an information handling system pairable with a wireless peripheral device and operably coupled to a wireless peripheral device manufacturer according to an embodiment of the present disclosure.

FIG. 2 is a graphic diagram of an information handling system 200 pairable with a wireless peripheral device 252 and operably coupled to a wireless peripheral device manufacturer 276 according to an embodiment of the present disclosure. It is appreciated that any type of peripheral device may be wirelessly coupled to the information handling system 200 and may include any wireless input/output device shown in FIG. 1 such as a wireless video display device (e.g., external video display device), a wireless stylus, a wireless trackpad, and other similar devices.

The information handling system 200 may, in an example embodiment, be a laptop-type information handling system 200. The information handling system 200 may, in an example embodiment, be a 360°-type information handling system 200. In the example shown in FIG. 2, the information handling system 200 may be a 360° information handling system 200 where an exterior surface of the bottom cover or bottom chassis 274 of a base chassis 275 may be brought towards an exterior side of the back display chassis 279 of the display chassis 281 to place the information handling system 200 in a tablet configuration in one embodiment. As shown in FIG. 2, the information handling system 200 may also be placed in a laptop configuration where the base chassis 275 is lying flat on a surface with the display chassis 281 being placed upright from the base chassis 275. Other configurations such as a dual tablet configuration and a tent orientation are contemplated as described herein.

The information handling system 200 may include a plurality of chassis made of metal, plastic, or the like. The information handling system 200, in an embodiment, may comprise an outer case or shell of an information handling system 200 for housing internal components of the information handling system 200, such as a video display device 244 (e.g., a built-in video display device 244), a cursor control device (e.g., built-in trackpad or touchpad 250), and an alpha numeric input device (e.g., built-in keyboard 291). As shown in FIG. 2, the information handling system 200 may include a built-in video display device 244 functioning to enclose the display chassis 281 with the back display chassis 279 described herein.

As another example, the information handling system 200 may further include the keyboard chassis 285 functioning to enclose a cursor control device such as a trackpad 250 and/or the built-in keyboard 291 acting as an alpha numeric input device. The back display chassis 279 and the video display device 244 may be joined together in an embodiment to form a fully enclosed display chassis 281, while the keyboard chassis 285 and a bottom chassis 274 may be joined together to form a fully enclosed base chassis 275. Taking a closed configuration as a reference position of the video display device 244 including the back display chassis 279 and the base chassis 275 including the keyboard chassis 285 and bottom chassis 274, the video display device 244 and back display chassis 279 may be rotated away from the base chassis 275 into the laptop configuration as shown in FIG. 2.

As described herein, the wireless peripheral device manufacturer 276 shown in FIG. 2 may be the entity that stores a PD ID 268 and a DICE certificate 294 on a storage device of the wireless peripheral device 252 (e.g., a wireless mouse in the example embodiment of FIG. 2) as well as pass, via a network connection, the DICE certificate 194 to a backend management server in some embodiments (not shown) for automatic discovery, verification, and initialization of BT pairing with the wireless peripheral device 252. As described herein, a backend management server database (not shown) may be operatively coupled to the wireless peripheral device manufacturer 276 and information handling system 200 as well and may include any entity that includes a root device identifier composition engine (DICE) certificate. This root DICE certificate may establish a root of trust between the backend management server 270 (e.g., as the source of trust) with any device that has a DICE certificate signed by the root DICE certificate in some embodiments.

An intermediate certificate or originating certificate may be held by the wireless peripheral device manufacturer 276 (e.g., signed by the root DICE certificate or originating at the wireless peripheral device manufacturer 276) is used to establish a device identity of the wireless peripheral device 286. As such, the use of the DICE certificate generated for each wireless peripheral device 286 is used to identify a wireless peripheral device 286 when a pairing session has been initiated. In an embodiment, the intermediate DICE certificate is used to create a DICE certificate over a public key that corresponds to a private key created at the wireless peripheral device 286 by the wireless peripheral device manufacturer 276 and stored on a memory device thereon. The DICE certificate over a public key created by the wireless peripheral device manufacturer 276 for the wireless peripheral device 286 is sometimes also referred to herein just as a DICE certificate 294.

Additionally, a copy of the peripheral device DICE certificate 294 and a PD ID 268 (e.g., a serial number associated with the wireless peripheral device 286) may be passed to the backend management server 270 to be correlated with the identification of the wireless peripheral device 286 (e.g., PD ID 268) with an identity of a user who purchased the wireless peripheral device 286 in some embodiments. For example, the backend management server 270 may include a list of users/information handling systems 200 that match, for example, purchasing data or other user identification data such that the wireless peripheral device 286 and its DICE certificate 294 and PD ID 268 can be associated with that user and the user's information handling system 200. This correlation of DICE certificate 294, PD ID 268, and user identification may be stored on the backend management server database 272 for later retrieval in some embodiments.

As the backend management server 270 receives the copy of the DICE certificate 294 and as the information handling system 200 receives a copy of the root DICE certificate from the backend management server 270, the wireless peripheral device 286 may be packaged and shipped to the user's location. It is appreciated that the wireless peripheral device 286 may be purchased using any means such as via an ecommerce store or other purchasing methods. The user may provide purchasing and shipping instructions not only for the wireless peripheral device 286 to be shipped to the correct location but also to identify the user at the backend management server 270 in some embodiments described herein. As the user receives the wireless peripheral device 286, the user may turn on the wireless peripheral device 286 to initiate one of several different types of Bluetooth® (BT) pairing methods described herein.

In an example embodiment, as the user powers on the wireless peripheral device 286, the wireless peripheral device 286 may broadcast a PD ID 268 to the information handling system 200. In an embodiment, transmissions between the wireless peripheral device 286 and the information handling system 200 may be conducted using a generic attribute (GATT) profile transmission. This GATT profile transmission may be conducted between two BLE devices such as the wireless peripheral device 286 and a BT radio of the information handling system 200.

The inclusion of the PD ID 268 in the broadcast causes the information handling system 200 to initiate a callback to cause the information handling system 200 to request the backend management server 270 cross-reference the PD ID 268 received to those maintained on the backend management server database 272. Where a matching PD ID 268 exists, correlated user and information handling system 200 data may be transmitted to the information handling system 200 as verification that the copy of the DICE certificate 294 matches the user and the PD ID 268.

Once the PD ID 268 has been verified, the wireless peripheral device 286 may send a digest of the DICE certificate 294 to the information handling system 200 upon request from the information handling system 200. At this point the digest of the DICE certificate 294 is checked against the root DICE certificate received by the information handling system 200 from the backend management server 270. Where the digest of the DICE certificate 294 can be verified via access to the root DICE certificate, the public key of the DICE certificate 294 may be extracted. As described herein, this public key 290 was included with the DICE certificate 294 while the wireless peripheral device 286 was with the wireless peripheral device manufacturer 276 and is associated with a private key held on the memory device of the wireless peripheral device 286.

After retrieving the public key 290 from the DICE certificate 294, a hardware processor (e.g., hardware processor, EC, GPU, etc.) may be used to execute computer readable program code of a OOB temporary key generator agent 284. Execution of the OOB temporary key generator agent 284 generates a OOB temporary key 266 used to securely pair the wireless peripheral device 286 with the information handling system 200. In an embodiment, the execution of the OOB temporary key generator agent 284 to create the OOB temporary key 266 may include the use of a RNG algorithm 288.

In an embodiment, a copy of the OOB temporary key 266 may be stored on a secure memory location such as, for example, a unified extensible firmware interface (UEFI) memory location to secure the OOB temporary key 266 until used later. The OOB temporary key 266 may be stored as a UEFI variable in the UEFI memory location for later access by an operating system (OS) Bluetooth® (BT) stack (not shown).

In an embodiment, the hardware processor may execute computer readable program code of an automatic peripheral device pairing management system pairing agent 256 to encrypt another copy of the OOB temporary key 266 using the public key 290. This encryption of the OOB temporary key 266 using the public key 290 by the execution of the automatic peripheral device pairing management system pairing agent 256 creates a public key-encrypted OOB temporary key 298 at the information handling system 200. In a particular embodiment, the automatic peripheral device pairing management system pairing agent 256 executes a Rivet-Shamir-Adleman (RSA) public key cryptographic algorithm to encrypt or wrap the generated OOB temporary key 266 for transmission to the wireless peripheral device 286.

At this point, the public key-encrypted OOB temporary key 298 is transmitted to the wireless peripheral device 286 using the GATT profile transmission described herein. Again, because wireless peripheral device 286 included the private key 296 and was the only source of the private key 296, only the wireless peripheral device 286 can decrypt the public key-encrypted OOB temporary key 298 using the private key 296. In an embodiment, a microcontroller or other hardware processor may execute a decrypting agent 292 to, with the private key 296, decrypt the public key-encrypted OOB temporary key 298 to retrieve the OOB temporary key 266.

In an embodiment, both the information handling system 200 and the wireless peripheral device 286 will each have a copy of the OOB temporary key 266 to continue the pairing process. Again, the OOB temporary key 266 UEFI memory device 260 stores the OOB temporary key 266 in secure memory locations in various memory devices in various embodiments.

In an embodiment, the OS BT stack includes computer executable program code with hardware that, when executed by a hardware processor (e.g., hardware processor, embedded controller, or any other hardware processing resource) along with code instructions of the automatic peripheral device pairing management system pairing agent 256 of the information handling system 200, performs automatic querying, verification, and initiation of BT pairing operations between the information handling system 200 and wireless peripheral device 286, and controls operations of a Bluetooth radio under any BT protocols, among other functions. The frequency with which the Bluetooth stack of the Bluetooth radio queries the UEFI variable data 262 to determine if OOB temporary key 266 and PD ID 268 data is available may vary and the present specification contemplates scheduled queries of the UEFI variable data 262 or request-initiated queries.

After decrypting the public key-encrypted OOB temporary key 298, the wireless peripheral device 286 broadcasts the PD ID 268 via, for example, an OOB BT broadcast. In an embodiment, this broadcast includes a pairing request to the information handling system 200 to BT pair with the wireless peripheral device 286. In the embodiments herein, the OS BT stack associated with the Bluetooth radio may detect this PD ID 268 and, via execution of code instructions of the automatic peripheral device pairing management system pairing agent 256 of the information handling system 200, compare it to the PD ID 268 stored on the UEFI memory device.

Where the broadcasted PD ID 268 provided by the wireless peripheral device 286 matches the PD ID 268 stored in the UEFI memory device 260, the automatic verification and initiation of BT pairing process may proceed via execution of code instructions of the automatic peripheral device pairing management system pairing agent 256.

In an embodiment, the Bluetooth stack of the Bluetooth radio may request certain received signal strength indicator (RSSI) data signal (e.g., 335, FIG. 3) from the wireless peripheral device 286. RSSI data signal is received by the BT radio of the information handling system 200 and the power level being received from the radio at the wireless peripheral device 286 (e.g., after calculated antenna and cable loss) can be determined. RSSI threshold data received by the wireless interface adapter of the information handling system 200 indicates whether, in an embodiment, the wireless peripheral device 286 is within a threshold range of the information handling system 200. Where the RSSI value meets or exceeds the RSSI threshold value, the OS BT stack of the Bluetooth radio within the information handling system 200 may continue the automatic verification and initiation of BT pairing process to establish a BT wireless link.

The information handling system 200 may then verify that the OOB temporary key 266 matches the OOB temporary key 266 now stored at the wireless peripheral device 286 attempting to BT pair with the information handling system 200. This may be done with a process where the OOB temporary key 266 is used to encrypt a message or data sent to the wireless peripheral device 286 and the OOB temporary key 266 is used to decrypt the message and a message is encrypted and decrypted in the reverse between the wireless peripheral device 286 and the information handling system 200 as well. This exchange of message values encrypted and decrypted at both sides of the BT pairing may be conducted according to a confirm value generation function in various embodiments. With such encryption and decryption if the messages match, the OOB temporary key 266 and OOB temporary key 266 on the wireless peripheral device 286 may be verified as matching in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 286 to the information handling system 200 and set up a BT wireless link with a session key. In an embodiment, the information handling system 200 and wireless peripheral device 286 can each provide various automatic querying, verification, and BT pairing communications that includes the OOB temporary key 266 verification and a pairing response command via an OOB BT communication prior to establishing a BT wireless link with a secure session key under any of the BT standards.

In an example embodiment, the information handling system 200 may encrypt an Mconfirm value generated there with a confirm value generation function and encrypted with its copy of the OOB temporary key 266 via an encryption algorithm, and then provide encrypted Mconfirm to the wireless peripheral device 286. The wireless peripheral device 286 decrypts this received Mconfirm value with its own stored copy of the OOB temporary key 266. Further, the decrypted Mconfirm value may be compared to an Sconfirm value generated at the wireless peripheral device 286 using the confirm value generation function. The wireless peripheral device 286 encrypts the Sconfirm value with the OOB temporary key 266 and sends it to the information handling system 200 for decryption using the OOB temporary key 266 to determine the sent Sconfirm value. A match of the received Sconfirm from the wireless peripheral device 286 with the Mconfirm from the information handling system 200 may be used as verification that the wireless peripheral device 286 and information handling system 200 are assigned and authenticated to pair in such an example embodiment. Where the values match, the BT pairing process establishes a session key and a BT wireless link via the OS BT stack and BT protocols. Then the BT pairing process is completed between the wireless peripheral device 286 and information handling system 200. In an embodiment, once the wireless peripheral device 286 is paired with the information handling system 200, the OOB temporary key 266 is no longer used and the OOB temporary key 266 on both the information handling system 200 and the wireless peripheral device 286 may be deleted. Thus, in an embodiment, the OOB temporary key 266 may be a single use temporary key in some embodiments.

In another example embodiment, as the user powers on the wireless peripheral device 286, the wireless peripheral device 286 may broadcast a PD ID 268 to the information handling system 200. The inclusion of the PD ID 268 in the broadcast causes the information handling system 200 to initiate a callback to cause the information handling system 200 to confirm the identity of the wireless peripheral device 286. Along with this initial transmission of the PD ID 268, the wireless peripheral device 286 may transmit the DICE certificate via the GATT profile transmission. Although the DICE certificate 294 includes a public key 290, no other entity apart from the wireless peripheral device 286 (which holds the private key) can access information that may be used by third-party entities during man-in-the-middle attacks. At this point the DICE certificate 294 is checked against the root DICE certificate received from the backend management server 270 by the information handling system 200 either while the information handling system 200 was connected to the backend management server 270 via the network 236 or during manufacture of the information handling system 200. Where the DICE certificate 294 can be verified via access to the root DICE certificate, the public key of the DICE certificate 294 may be extracted.

After retrieving the public key 290 from the DICE certificate 294, a hardware processor (e.g., hardware processor, EC, GPU, etc.) may be used to execute computer readable program code of a OOB temporary key generator agent 284 to create the OOB temporary key 266 and may include the use of a random number generator (RNG) algorithm 288. The RNG algorithm 288, when executed by the OOB temporary key generator agent 284, may develop a set of random numbers that are unique to the pairing session between the wireless peripheral device 286 and information handling system 200.

In an embodiment, a copy of the OOB temporary key 266 may be stored on a secure memory location such as, for example, a unified extensible firmware interface (UEFI) memory location to secure the OOB temporary key 266 until used later. The OOB temporary key 266 may be stored as a UEFI variable in the UEFI memory location for later access by an operating system (OS) Bluetooth® (BT) stack (not shown).

In an embodiment, the hardware processor may execute computer readable program code of an automatic peripheral device pairing management system pairing agent 256 to encrypt the OOB temporary key 266 using the public key 290. This encryption of the OOB temporary key 266 using the public key 290 by the execution of the automatic peripheral device pairing management system pairing agent 256 creates a public key-encrypted OOB temporary key 298 at the information handling system 200. In a particular embodiment, the automatic peripheral device pairing management system pairing agent 256 executes a Rivet-Shamir-Adleman (RSA) public key cryptographic algorithm to encrypt or wrap the generated OOB temporary key 266 for transmission to the wireless peripheral device 286.

At this point, the public key-encrypted OOB temporary key 298 is transmitted to the wireless peripheral device 286 using the GATT profile transmission described herein. Again, because wireless peripheral device 286 included the private key 296 and was the only source of the private key 296, only the wireless peripheral device 286 can decrypt the public key-encrypted OOB temporary key 298. In an embodiment, a microcontroller or other hardware processor may execute a decrypting agent 292 to, with the private key 296, decrypt the public key-encrypted OOB temporary key 298 to retrieve the OOB temporary key 266.

In an embodiment, both the information handling system 200 and the wireless peripheral device 286 will each have a copy of the OOB temporary key 266 to continue the pairing process. Again, the information handling system 200 may store the OOB temporary key 266 UEFI memory device 260 as UEFI variable data 262 or store the OOB temporary key 266 in other secure memory locations in various memory devices in various embodiments.

In an embodiment, the OS BT stack (e.g., FIG. 4, 472) includes computer executable program code with hardware that, when executed by a hardware processor (e.g., hardware processor, embedded controller, or any other hardware processing resource) along with code instructions of the automatic peripheral device pairing management system pairing agent 256 of the information handling system 200, performs automatic querying, verification, and initiation of BT pairing operations between the information handling system 200 and wireless peripheral device 286, and controls operations of a Bluetooth radio under any BT protocols, among other functions. Again, the frequency with which the Bluetooth stack of the Bluetooth radio queries the UEFI variable data 262 to determine if OOB temporary key 266 and PD ID 268 data is available may vary and the present specification contemplates a schedule querying or request-initiated querying of the UEFI variable data 262.

After decrypting the public key-encrypted OOB temporary key 298, the wireless peripheral device 286 broadcasts the PD ID 268 via, for example, an OOB BT broadcast in a pairing query. In an embodiment, this broadcast includes a pairing request to the information handling system 200 to BT pair with the wireless peripheral device 286. In the embodiments herein, the OS BT stack associated with the Bluetooth radio may detect this PD ID 268 and, via execution of code instructions of the automatic peripheral device pairing management system pairing agent 256 of the information handling system 200, compare it to the PD ID 268 stored on the UEFI memory device.

Where the broadcasted PD ID 268 provided by the wireless peripheral device 286 matches the PD ID 268 stored in the UEFI memory device 260, the automatic verification and initiation of BT pairing process may proceed via execution of code instructions of the automatic peripheral device pairing management system pairing agent 256. In an embodiment, the Bluetooth stack of the Bluetooth radio may request certain received signal strength indicator (RSSI) data signal (e.g., 435, FIG. 4) from the wireless peripheral device 286. RSSI data signal is received by the BT radio of the information handling system 200 and the power level being received from the radio at the wireless peripheral device 286 (e.g., after calculated antenna and cable loss) can be determined. Where the RSSI value meets or exceeds the RSSI threshold value, the OS BT stack of the Bluetooth radio within the information handling system 200 may continue the automatic verification and initiation of BT pairing process to establish a BT wireless link.

The automatic verification and initiation of the BT pairing process, in an embodiment, is executed by code instructions of the automatic peripheral device pairing management system pairing agent 256 of the information handling system 200 and includes the information handling system 200 verifying that the OOB temporary key 266 matches the OOB temporary key 266 now stored at the wireless peripheral device 286 attempting to BT pair with the information handling system 200. This may be done with a process where the OOB temporary key 266 is used to encrypt a message or data sent to the wireless peripheral device 286 and the OOB temporary key 266 is used to decrypt the message and a message is encrypted and decrypted in the reverse between the wireless peripheral device 286 and the information handling system 200 as well. This exchange of message values encrypted and decrypted at both sides of the BT pairing may be conducted according to a confirm value generation function in various embodiments. With such encryption and decryption if the messages match, the OOB temporary key 266 and OOB temporary key 266 on the wireless peripheral device 286 may be verified as matching in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 286 to the information handling system 200 and set up a BT wireless link with a session key. In an embodiment, the information handling system 200 and wireless peripheral device 286 can each provide various automatic querying, verification, and BT pairing communications that includes the OOB temporary key 266 verification and a pairing response command via an OOB BT communication prior to establishing a BT wireless link with a secure session key under any of the BT standards.

In an example embodiment, the information handling system 200 may encrypt an Mconfirm value generated there with a confirm value generation function and encrypted with its copy of the OOB temporary key 266 via an encryption algorithm, and then provide encrypted Mconfirm to the wireless peripheral device 286. The wireless peripheral device 286 decrypts this received Mconfirm value with its own stored copy of the OOB temporary key 266. Further, the decrypted Mconfirm value may be compared to an Sconfirm value generated at the wireless peripheral device 286 using the confirm value generation function. The wireless peripheral device 286 encrypts the Sconfirm value with the OOB temporary key 166 and sends it to the information handling system 200 for decryption using the OOB temporary key 266 to determine the sent Sconfirm value. A match of the received Sconfirm from the wireless peripheral device 286 with the Mconfirm from the information handling system 200 may be used as verification that the wireless peripheral device 186 and information handling system 200 are assigned and authenticated to pair in such an example embodiment. Where the values match, the BT pairing process establishes a session key and a BT wireless link via the OS BT stack and BT protocols. Then the BT pairing process is completed between the wireless peripheral device 286 and information handling system 200. In an embodiment, once the wireless peripheral device 286 is paired with the information handling system 200, the OOB temporary key 266 is no longer used and the OOB temporary key 266 on both the information handling system 200 and the wireless peripheral device 286 may be deleted. Thus, in an embodiment, the OOB temporary key 266 may be a single use temporary key in some embodiments.

In yet another example embodiment, as the user powers on the wireless peripheral device 286, the wireless peripheral device 286 may broadcast a PD ID 268 to the information handling system 200. The inclusion of the PD ID 268 in the broadcast causes the information handling system 200 to initiate a callback to cause the information handling system 200 to request the backend management server 270 cross-reference the PD ID 268 received to those maintained on the backend management server database 272. Where a matching PD ID 268 exists, correlated user and information handling system 200 data may be transmitted to the information handling system 200 along with a copy of the DICE certificate 294 associated with the user and the information handling system 200 by the backend management server 270 as verification that the copy of the DICE certificate 294 matches the user and the PD ID 268.

Once the PD ID 268 has been verified, the information handling system 200 engages in a security protocol and data model (SPDM) binding to Bluetooth® protocol to initiate a private communication channel over Bluetooth®. In an embodiment, this includes utilizing a Diffie-Hellman algorithm to create a tunnel over which a generated OOB temporary key 266 may be transmitted from the information handling system 200 to the wireless peripheral device 286. The SPDM binding to BT protocol includes the information handling system 200 requesting a version of the wireless peripheral device 286 and the wireless peripheral device 286 responding with its version. The SPDM binding to BT protocol further includes the information handling system 200 requesting hardware and software capabilities of the device with the wireless peripheral device 286 responding with data describing those capabilities of the wireless peripheral device 286. Still further, the SPDM binding to BT protocol includes negotiating which algorithm to use to create the Diffie-Hellman communication tunnel with the wireless peripheral device 286 returning data describing the appropriate algorithm to use. Even further, the SPDM binding to BT protocol includes, in the present specification, a request from the information handling system 200 to the wireless peripheral device 286 for the DICE certificate 294 maintained on the memory device of the wireless peripheral device 286. The wireless peripheral device 286 then sends the DICE certificate 294 to the information handling system 200.

At this point, the information handling system 200 may compare the DICE certificate 294 received over the SPDM binding to BT protocol communication channel to the DICE certificate 294 received from the backend management server 270. Where the DICE certificates 294 do not match, the pairing process is terminated. Where they do match, the SPDM binding to BT protocol continues with the information handling system 200 exchanging encryption session keys to create an encrypted session.

Once the encrypted session has been created, a hardware processor (e.g., hardware processor, EC, GPU, etc.) may be used to execute computer readable program code of a OOB temporary key generator agent 284. Execution of the OOB temporary key generator agent 284 generates a OOB temporary key 266 used to securely pair the wireless peripheral device 286 with the information handling system 200. In an embodiment, the execution of the OOB temporary key generator agent 284 to create the OOB temporary key 266 may include the use of a random number generator (RNG) algorithm 288. The RNG algorithm 288, when executed by the OOB temporary key generator agent 284, may develop a set of random numbers that are unique to the pairing session between the wireless peripheral device 286 and information handling system 200. It is appreciated as well that other types of number generators may be executed by the OOB temporary key generator agent 284 and the present specification contemplates the use of these other number generators.

In an embodiment, a copy of the OOB temporary key 266 may be stored on a secure memory location such as, for example, a unified extensible firmware interface (UEFI) memory location to secure the OOB temporary key 266 until used later. The OOB temporary key 266 may be stored as a UEFI variable in the UEFI memory location for later access by an operating system (OS) Bluetooth® (BT) stack (not shown).

At this point, another OOB temporary key 266 is transmitted to the wireless peripheral device 286 using the SPDM binding to BT protocol described herein. In an embodiment, a copy of the OOB temporary key 266 OOB temporary key 266 is sent, via this secure communication channel, to the wireless peripheral device 286 for automatic comparison between the information handling system 200 and wireless peripheral device 286.

In an embodiment, both the information handling system 200 and the wireless peripheral device 286 will each have a copy of the OOB temporary key 266 to continue the pairing process. Again, the information handling system 200 may store the OOB temporary key 266 UEFI memory device 260 as UEFI variable data 262 or store the OOB temporary key 266 in other secure memory locations in various memory devices in various embodiments.

In an embodiment, the OS BT stack includes computer executable program code with hardware that, when executed by a hardware processor (e.g., hardware processor, embedded controller, or any other hardware processing resource) along with code instructions of the automatic peripheral device pairing management system pairing agent 256 of the information handling system 200, performs automatic querying, verification, and initiation of BT pairing operations between the information handling system 200 and wireless peripheral device 286, and controls operations of a Bluetooth radio under any BT protocols, among other functions. The frequency with which the Bluetooth stack of the Bluetooth radio queries the UEFI variable data 262 to determine if OOB temporary key 266 and PD ID 268 data is available may vary.

Where the broadcasted PD ID 268 provided by the wireless peripheral device 286 matches the PD ID 268 stored in the UEFI memory device 260, the automatic verification and initiation of BT pairing process may proceed via execution of code instructions of the automatic peripheral device pairing management system pairing agent 256. In an embodiment, the Bluetooth stack of the Bluetooth radio may request certain received signal strength indicator (RSSI) data signal (e.g., 535, FIG. 5) from the wireless peripheral device 286. RSSI data signal is received by the BT radio of the information handling system 200 and the power level being received from the radio at the wireless peripheral device 286 (e.g., after calculated antenna and cable loss) can be determined. RSSI threshold data received by the wireless interface adapter of the information handling system 200 indicates whether, in an embodiment, the wireless peripheral device 286 is within a threshold range of the information handling system 200 where the RSSI value meets or exceeds the RSSI threshold value, the OS BT stack of the Bluetooth radio within the information handling system 200 may continue the automatic verification and initiation of BT pairing process to establish a BT wireless link.

The automatic verification and initiation of the BT pairing process, in an embodiment, is executed by code instructions of the automatic peripheral device pairing management system pairing agent 256 of the information handling system 200 and includes the information handling system 200 verifying that the OOB temporary key 266 matches the OOB temporary key 266 now stored at the wireless peripheral device 286 attempting to BT pair with the information handling system 200. This may be done with a process where the OOB temporary key 266 is used to encrypt a message or data sent to the wireless peripheral device 286 and the OOB temporary key 266 is used to decrypt the message and a message is encrypted and decrypted in the reverse between the wireless peripheral device 286 and the information handling system 200 as well. This exchange of message values encrypted and decrypted at both sides of the BT pairing may be conducted according to a confirm value generation function in various embodiments. With such encryption and decryption if the messages match, the OOB temporary key 266 and OOB temporary key 266 on the wireless peripheral device 286 may be verified as matching in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 286 to the information handling system 200 and set up a BT wireless link with a session key. In an embodiment, the information handling system 200 and wireless peripheral device 286 can each provide various automatic querying, verification, and BT pairing communications that includes the OOB temporary key 266 verification and a pairing response command via an OOB BT communication prior to establishing a BT wireless link with a secure session key under any of the BT standards.

In an example embodiment, the information handling system 200 may encrypt an Mconfirm value generated there with a confirm value generation function and encrypted with its copy of the OOB temporary key 266 via an encryption algorithm, and then provide encrypted Mconfirm to the wireless peripheral device 286. The wireless peripheral device 286 decrypts this received Mconfirm value with its own stored copy of the OOB temporary key 266. Further, the decrypted Mconfirm value may be compared to an Sconfirm value generated at the wireless peripheral device 286 using the confirm value generation function. The wireless peripheral device 286 encrypts the Sconfirm value with the OOB temporary key 166 and sends it to the information handling system 200 for decryption using the OOB temporary key 266 to determine the sent Sconfirm value. A match of the received Sconfirm from the wireless peripheral device 286 with the Mconfirm from the information handling system 200 may be used as verification that the wireless peripheral device 186 and information handling system 200 are assigned and authenticated to pair in such an example embodiment. Where the values match, the BT pairing process establishes a session key and a BT wireless link via the OS BT stack and BT protocols. Then the BT pairing process is completed between the wireless peripheral device 286 and information handling system 200. In an embodiment, once the wireless peripheral device 286 is paired with the information handling system 200, the OOB temporary key 266 is no longer used and the OOB temporary key 266 on both the information handling system 200 and the wireless peripheral device 286 may be deleted. Thus, in an embodiment, the OOB temporary key 266 may be a single use temporary key in some embodiments.

The systems and methods described herein allow for a secure system and method of BT pairing a wireless peripheral device 286. The information handling system 200 may generate its own OOB temporary key 266, on-the-fly either online or offline in order to securely and automatically query, verify, and BT pair an information handling system 200 to a wireless peripheral device 286. For example, because the wireless peripheral device 286 is the only entity that holds a private key that matches the public key of the DICE certificate 294, presentation of a public key-encrypted OOB temporary key 298 to the wireless peripheral device 286 will securely allow the wireless peripheral device 286 to BT pair with the information handling system 200 in some embodiments. Where a private key is not used, a device certificate may be accessed by the information handling system 200 from a backend management server 270 and the wireless peripheral device 286 concurrently over a secure communication channel using SPDM binding to BT protocol so that such an encrypted communication channel may secure data transmitted to and from the wireless peripheral device 286. Further, the OOB temporary key 266 is ephemeral in that it is generated and or exposed only when needed, shared securely, and then deleted after verification of BT pairing adding security from interception and use by unauthorized parties in embodiments herein.

Figure 3:
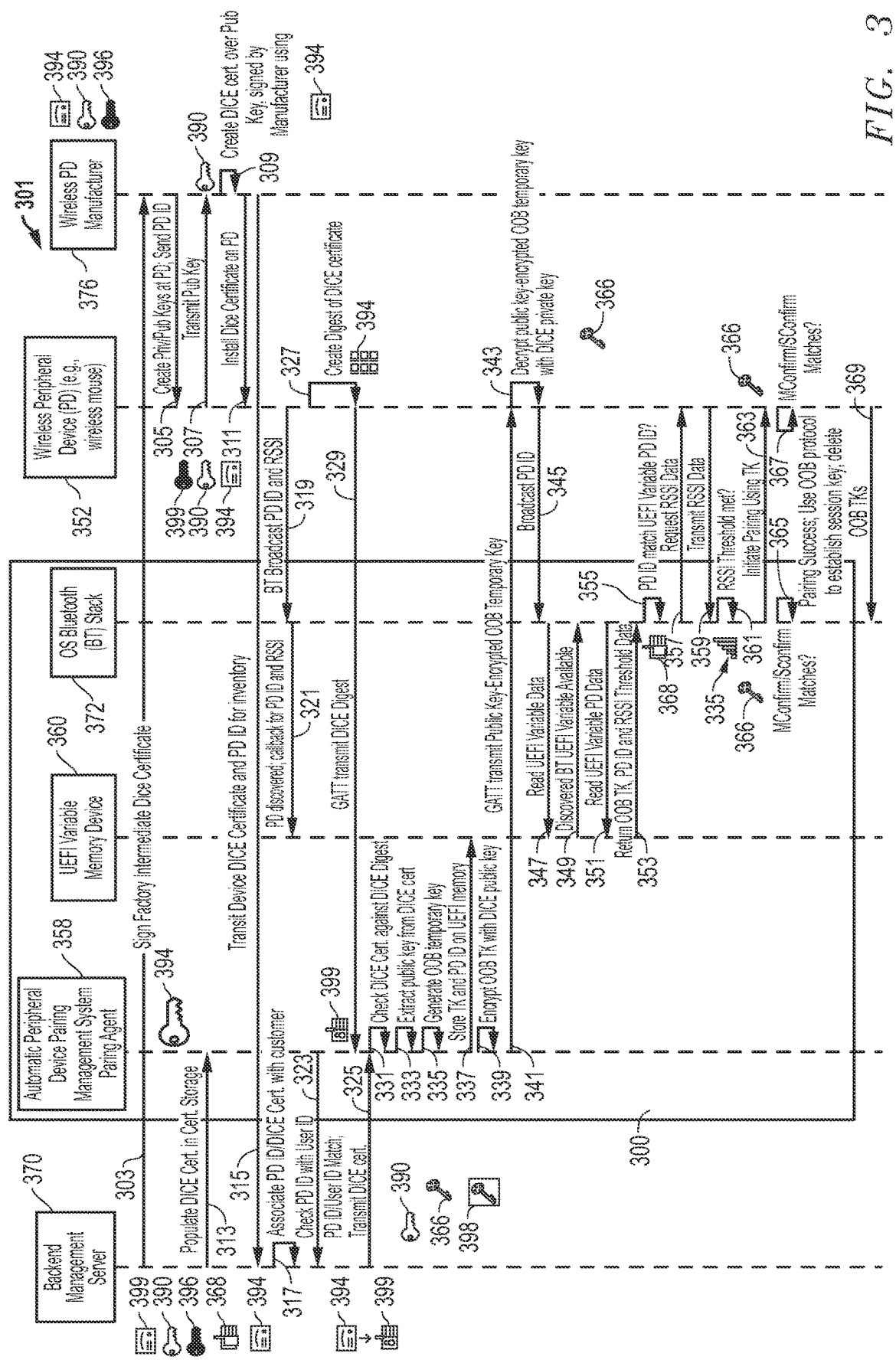
FIG. 3 is a process flow diagram of a method of automatically querying, verifying, and Bluetooth® pairing a wireless peripheral device to an information handling system using a device identifier composition engine (DICE) certificate received from a wireless peripheral device and a root DICE certificate from a backend server according to an embodiment of the present disclosure.

FIG. 3 is a process flow diagram of a method 301 of automatically querying, verifying, and Bluetooth® pairing a wireless peripheral device to an information handling system using a DICE certificate 394 received from a wireless peripheral device and a root DICE certificate 399 from a backend management server 370 according to an embodiment of the present disclosure. As described herein, the backend management server 370 may be an entity that includes a root DICE certificate 399. This root DICE certificate 399 may establish a root of trust between the backend management server 370 (e.g., as the source of trust) with any device that has a DICE certificate 394 signed by the root DICE certificate 399. In an embodiment, this root DICE certificate 399 may be used to sign a factory server certificate at line 303 or, in the example embodiment described herein, a certificate associated with the wireless peripheral device manufacturer 376. This intermediate certificate held by the wireless peripheral device manufacturer 376 and signed by the root DICE certificate 399 at the backend management server 370 may be used to create a certificate chain in some embodiments herein. At line 305 a private key 396/public key 390 asymmetric pair may be assigned to the wireless peripheral device 352. At line 307, the generated public key 390 is retrieved by the wireless peripheral device manufacturer 376 and, at line 309, used to create a DICE certificate 394 over a public key 390 that is signed by the wireless peripheral device manufacturer 376. In an embodiment, the use of the DICE certificate 394 generated for each wireless peripheral device 352 is used to identify a wireless peripheral device 352 when a pairing session has been initiated. In an embodiment, the intermediate DICE certificate is used to create a DICE certificate 394 over a public key 390 at line 309 that corresponds to a private key 396 created at or for the wireless peripheral device 352 by the wireless peripheral device manufacturer 376 and stored on a memory device thereon. The DICE certificate 394 over a public key 390 created by the wireless peripheral device manufacturer 376 for the wireless peripheral device 352 is also referred to herein just as a DICE certificate 394 and is installed, at line 311 onto a secure memory location within the wireless peripheral device 352.

Additionally, at line 315, a copy of the peripheral device DICE certificate 394 and a PD ID 368 (e.g., a serial number associated with the wireless peripheral device 352) is passed to the backend management server 370 to be correlated or associated, at line 317, with the identification of the wireless peripheral device 352 (e.g., PD ID 368) and with an identity of a user who purchased the wireless peripheral device 352. Purchasing data or user identification data may also be transmitted. For example, the backend management server 370 may include a list of users/information handling systems 300 that match, for example, purchasing data or other user identification data such that the wireless peripheral device 352 and its DICE certificate 394 and PD ID 368 can be associated with that user and the user's information handling system 300. This correlation of DICE certificate 394, PD ID 368, and user identification at line 317 may be stored on the backend management server database 372 for later retrieval.

By doing so, in an embodiment, the backend management server 370 may transmit the root DICE certificate to the user's information handling system being identified for later comparison with the DICE certificate 394 received from the wireless peripheral device 352 at line 313. In an embodiment, the backend management server 370 may simply verify, at line 313, that the root DICE certificate has been received by the information handling system 300 because, in some example embodiments, the information handling system 300 may already have the root DICE certificate installed during manufacturing of the information handling system. The preinstallation of the root DICE certificate may be a result of the manufacture of the information handling system 300 and the operating entity of the backend management server 370 being the same entity (e.g., Dell®). The preinstallation of the root DICE certificate may be done in anticipation for the user to purchase a wireless peripheral device 352 from the wireless peripheral device manufacturer 376 who has engaged in a business relationship with the operating entity of the backend management server 370/manufacturer of the information handling system. The root DICE certificate 399 may be stored on a certificate store or registry of the information handling system 300 such as Windows® Security Certificate Manager.

As the backend management server 370 receives the copy of the DICE certificate 394 at line 1315 and upon the information handling system 300 receives a copy of the root DICE certificate from the backend management server 370 at line 313, the wireless peripheral device 352 may be packaged and shipped to the user's location. It is appreciated that the wireless peripheral device 352 may be purchased using any means such as via an ecommerce store or other purchasing methods. The user may provide purchasing and shipping instructions not only for the wireless peripheral device 352 to be shipped to the correct location but also to identify the user at the backend management server 370 as described herein. As the user receives the wireless peripheral device 352, the user may turn on the wireless peripheral device 352 to initiate one of several different types of Bluetooth® (BT) pairing methods described herein.

In an example embodiment, as the user powers on the wireless peripheral device 352, the wireless peripheral device 352 may broadcast a PD ID 368 to the information handling system 300 at line 319. A digest of the DICE certificate 394 may be created at line 327 at the wireless peripheral device 352 and include a hash version of the DICE certificate 394 used for authentication of the DICE certificate 394 in an embodiment. In an embodiment, therefore, the DICE certificate 394 is subjected to a hash algorithm to secure the data present in the DICE certificate 394 during transmission from the wireless peripheral device 352 and the information handling system 100 at line 319. In an embodiment, transmissions between the wireless peripheral device 352 and the information handling system 300 may be conducted using a generic attribute (GATT) profile transmission. This GATT profile transmission may be conducted between two BLE devices such as the wireless peripheral device 352 and a BT radio of the information handling system 300.

The inclusion of the PD ID 368 in the broadcast causes the information handling system 300 to initiate a callback at line 321 to cause the information handling system 300 to request the backend management server 370 cross-reference the PD ID 368 received to those maintained on the backend management server database 372 at line 323. Where a matching PD ID 368 exists, correlated user and information handling system 300 data may be transmitted to the information handling system 300 as verification that the copy of the DICE certificate 394 matches the user and the PD ID 368 at line 325. It is appreciated that data transmissions between the information handling system 300 and backend management server 370 may be carried out via a secure transmission protocol such as transport layer security (TLS) protocols that use cryptographic protocols to prevent man-in-the-middle attacks from third-party entities.

Once the PD ID 368 has been verified at line 325, the wireless peripheral device 352 may send a digest of the DICE certificate 394 to the information handling system 300 upon request from the information handling system 300 at line 329. The digest of the DICE certificate 394 may be sent to confirm the identity of the wireless peripheral device 352. At this point the digest of the DICE certificate 394 is checked against the DICE certificate received earlier from the backend management server 370 by the information handling system 300 at line 331. Where the DICE certificate is not present for the DICE certificate 394, the BT pairing process is not completed.

Where the digest of the DICE certificate digest 394 can be verified via access to the DICE certificate at line 331, the public key of the DICE certificate 394 may be extracted at line 33. As described herein, this public key 390 was included with the DICE certificate 394 while the wireless peripheral device 352 was with the wireless peripheral device manufacturer 376 and is associated with a private key held on the memory device of the wireless peripheral device 352.

After retrieving the public key 390 from the DICE certificate 394, a hardware processor (e.g., hardware processor, EC, GPU, etc.) may be used to execute computer readable program code of a OOB temporary key generator agent at line 335. Execution of the OOB temporary key generator agent at line 335 generates a OOB temporary key 366 used to securely pair the wireless peripheral device 352 with the information handling system 300. In an embodiment, the execution of the OOB temporary key generator agent to create the OOB temporary key 366 may include the use of a random number generator (RNG) algorithm. The RNG algorithm, when executed by the OOB temporary key generator agent, may develop a set of random numbers that are unique to the pairing session between the wireless peripheral device 352 and information handling system 300. It is appreciated as well that other types of number generators may be executed by the OOB temporary key generator agent and the present specification contemplates the use of these other number generators.

In an embodiment, a copy of the OOB temporary key 366 may be stored, at line 337, on a secure memory location such as, for example, a unified extensible firmware interface (UEFI) memory location to secure the OOB temporary key 366 until used later. The OOB temporary key 366 may be stored as a UEFI variable in the UEFI memory location for later access by the OS BT stack 372.

In an embodiment, the hardware processor may execute computer readable program code of an automatic peripheral device pairing management system pairing agent 356 to encrypt another copy of the OOB temporary key 366 using the public key 390 at line 339. This encryption of the OOB temporary key 366 using the public key 390 by the execution of the automatic peripheral device pairing management system pairing agent 356 creates a public key-encrypted OOB temporary key 398 at the information handling system 300. In an embodiment, the automatic peripheral device pairing management system pairing agent 356 may execute any type of public-key cryptography. In a particular embodiment, the automatic peripheral device pairing management system pairing agent 356 executes a Rivet-Shamir-Adleman (RSA) public key cryptographic algorithm to encrypt or wrap the generated OOB temporary key 366 for transmission to the wireless peripheral device 352.

At line 341, the public key-encrypted OOB temporary key 398 is transmitted to the wireless peripheral device 352 using the GATT profile transmission described herein. Again, because wireless peripheral device 352 included the private key 396 and was the only source of the private key 396, only the wireless peripheral device 352 can decrypt, at line 343, the public key-encrypted OOB temporary key 398. In an embodiment, a microcontroller or other hardware processor may execute a decrypting agent 392 to, with the private key 396, decrypt the public key-encrypted OOB temporary key 398 to retrieve the OOB temporary key 366.

In an embodiment, at this point both the information handling system 300 and the wireless peripheral device 352 each have a copy of the OOB temporary key 366 to continue the pairing process. Again, the information handling system 300 may store the OOB temporary key 366 UEFI memory device 360 as UEFI variable data 362 or store the OOB temporary key 366 in other secure memory locations in various memory devices in various embodiments. The UEFI memory device 360 on the information handling system 300 may be any memory device that maintains the OOB temporary key 366 for later retrieval by an operating system (OS) Bluetooth® (BT) stack 372 under direction of a hardware processor in one embodiment. In an embodiment, the UEFI variable data 362 is stored on a flash memory device associated with the basic input/output system (BIOS).

In an embodiment, the OS BT stack includes computer executable program code with hardware that, when executed by a hardware processor (e.g., hardware processor, embedded controller, or any other hardware processing resource) along with code instructions of the automatic peripheral device pairing management system pairing agent 356 of the information handling system 300, performs automatic querying, verification, and initiation of BT pairing operations between the information handling system 300 and wireless peripheral device 352, and controls operations of a Bluetooth radio under any BT protocols, among other functions. A plurality of protocols may be present in the Bluetooth stack which may include core protocols including Bluetooth radio, baseband, link manage protocol, logical link control and adaptation protocol, and service discovery protocols. Further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio) used to transmit radio waves at a specific frequency as described herein. The frequency with which the Bluetooth stack of the Bluetooth radio queries the UEFI variable data 362 to determine if OOB temporary key 366 and PD ID 368 is available may vary. In an embodiment, the Bluetooth stack may query the UEFI memory device 360 at line 347 for the UEFI variable data 362 during every power up of the information handling system 300. In an embodiment, the Bluetooth stack may query the UEFI variable data 362 on the UEFI memory device 360 a plurality of times when the information handling system 300 is powered up. Where available, the UEFI variable memory device 360 indicates, at line 349, that the OOB temporary key 366 and PD ID 368 are available. At line 351, the OS BT stack 372 requests the OOB temporary key 366 and PD ID 368 and the UEFI variable memory device 360 provides this data at line 353.

After decrypting the public key-encrypted OOB temporary key 398 at line 343, the wireless peripheral device 352 broadcasts the PD ID 368 via, for example, an OOB BT broadcast at line 345. That broadcasting indicates the availability of the wireless peripheral device 352 to continue the pairing process with the information handling system 300. In an embodiment, this broadcast includes a pairing request to the information handling system 300 to BT pair with the wireless peripheral device 352. In the embodiments herein, the OS BT stack associated with the Bluetooth radio may detect this PD ID 368 and, via execution of code instructions of the automatic peripheral device pairing management system pairing agent 356 of the information handling system 300, compare it to the PD ID 368 stored on the UEFI memory device at line 355.

Where the PD ID 368 provided by the wireless peripheral device 352 does not match the PD ID 368 accessed by the Bluetooth stack of the Bluetooth radio, the pairing process is not completed. Where the broadcasted PD ID 368 provided by the wireless peripheral device 352 matches the PD ID 368 stored in the UEFI memory device 360 at line 355, the automatic verification and initiation of BT pairing process may proceed via execution of code instructions of the automatic peripheral device pairing management system pairing agent 356.

In an embodiment, the Bluetooth stack of the Bluetooth radio may request certain received signal strength indicator (RSSI) data signal 335 from the wireless peripheral device 352 at line 357. RSSI data signal is received, at line 359, by the BT radio of the information handling system 300 and the power level being received from the radio at the wireless peripheral device 352 (e.g., after calculated antenna and cable loss) can be determined. RSSI threshold data received by the wireless interface adapter of the information handling system 300 indicates whether, in an embodiment, the wireless peripheral device 352 is within a threshold range of the information handling system 300. In an embodiment where multiple wireless peripheral devices 386 are activated near the information handling system 300, the RSSI threshold may prevent other wireless peripheral devices 386 that are not within a threshold distance of the user's information handling system 300 from initiating automatic BT pairing. The RSSI power level provided by the wireless peripheral device 352 may be compared to an RSSI threshold value set at the Bluetooth radio of the information handling system 300. Where the wireless peripheral device 352 RSSI value does not meet or exceed the RSSI threshold value at line 361, the information handling system 300 may ignore the pairing request of the wireless peripheral device 352. Where the RSSI value meets or exceeds the RSSI threshold value at line 361, the OS BT stack of the Bluetooth radio within the information handling system 300 may continue the automatic verification and initiation of BT pairing process to establish a BT wireless link.

The automatic verification and initiation of the BT pairing process at line 363, in an embodiment, is executed by code instructions of the automatic peripheral device pairing management system pairing agent 356 of the information handling system 300 and includes the information handling system 300 verifying that the OOB temporary key 366 matches the OOB temporary key 366 now stored at the wireless peripheral device 352 attempting to BT pair with the information handling system 300. This may be done with a process where the OOB temporary key 366 is used to encrypt a message or data generated at the information handling system 300 with a confirm value generation function and this encrypted data is sent to the wireless peripheral device 352. The OOB temporary key 366 at the wireless peripheral device 352 is used to decrypt the message. The confirm value generation function is used to generate a message that is compared to the received message. Further, this message is encrypted at the wireless peripheral device 352 and sent to the information handling system 300 where it is decrypted in the reverse between the wireless peripheral device 352 and the information handling system 300 for comparison to the original message as well. This exchange of message values encrypted and decrypted at both sides of the BT pairing may be conducted according to a confirm value generation function in various embodiments. With such encryption and decryption if the messages match, the OOB temporary key 366 and OOB temporary key 366 on the wireless peripheral device 352 may be verified as matching indicating assignment and authorization to pair in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 352 to the information handling system 300 and set up a BT wireless link with a session key. In an embodiment, the information handling system 300 and wireless peripheral device 352 can each provide various automatic querying, verification, and BT pairing communications that includes the OOB temporary key 366 verification and a pairing response command via an OOB BT communication prior to establishing a BT wireless link with a secure session key under any of the BT standards.

In an example embodiment, the information handling system 300 may encrypt an Mconfirm value generated there with a confirm value generation function and encrypted with its copy of the OOB temporary key 366 via an encryption algorithm, and then provide encrypted Mconfirm to the wireless peripheral device 386. The wireless peripheral device 386 decrypts this received Mconfirm value with its own stored copy of the OOB temporary key 366. Further, the decrypted Mconfirm value may be compared to an Sconfirm value generated at the wireless peripheral device 386 using the confirm value generation function at line 367. The wireless peripheral device 386 encrypts the Sconfirm value with the OOB temporary key 366 and sends it to the information handling system 300 for decryption using the OOB temporary key 366 to determine the sent Sconfirm value. A match of the received Sconfirm from the wireless peripheral device 386 with the Mconfirm from the information handling system 300 at line 365 may be used as verification that the wireless peripheral device 386 and information handling system 300 are assigned and authenticated to pair in such an example embodiment. Where the values match, the BT pairing process establishes a session key and a BT wireless link via the OS BT stack and BT protocols at line 369. Then the BT pairing process is completed between the wireless peripheral device 386 and information handling system 300. In an embodiment, once the wireless peripheral device 386 is paired with the information handling system 300, the OOB temporary key 366 is no longer used and the OOB temporary key 366 on both the information handling system 300 and the wireless peripheral device 386 may be deleted as well at line 369. Thus, in an embodiment, the OOB temporary key 366 may be a single use temporary key in some embodiments. Thus, in an embodiment, the OOB temporary key 366 may be a single use temporary key in some embodiments.

Figure 4:
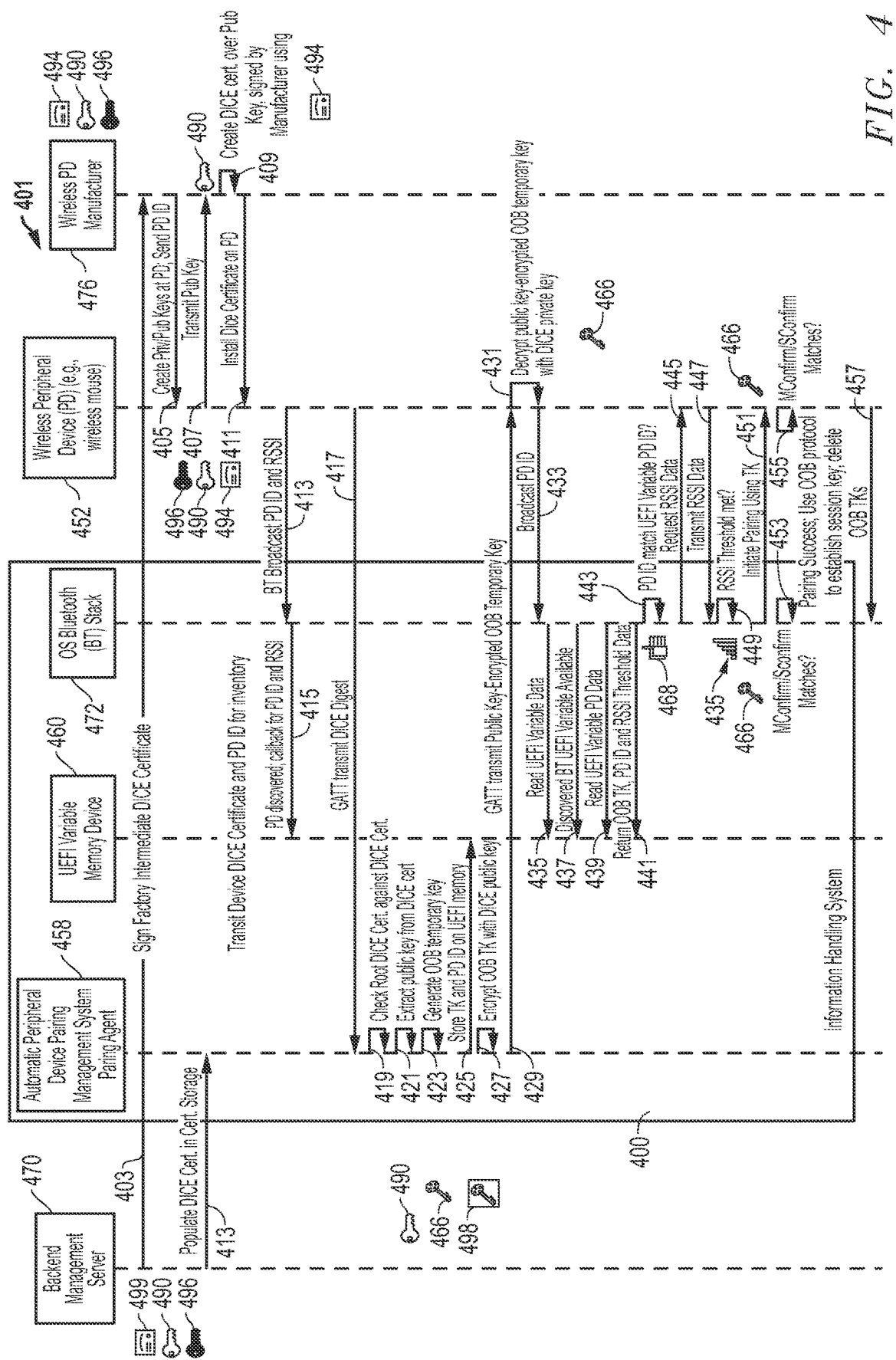
FIG. 4 is a process flow diagram of a method of automatically querying, verifying, and Bluetooth® pairing a wireless peripheral device to an offline information handling system using a DICE certificate received from a wireless peripheral device according to an embodiment of the present disclosure.

FIG. 4 is a process flow diagram of a method 401 of automatically querying, verifying, and Bluetooth® pairing a wireless peripheral device 452 to an offline information handling system using a DICE certificate received from a wireless peripheral device 452 according to an embodiment of the present disclosure. As described herein, the backend management server 470 may be an entity that includes a root DICE certificate 499. This root DICE certificate 499 may establish a root of trust between the backend management server 470 (e.g., as the source of trust) with any device that has a DICE certificate 494 signed by the root DICE certificate 499. In an embodiment, this root DICE certificate 499 may be used to sign a factory server certificate at line 303 or, in the example embodiment described herein, a certificate associated with the wireless peripheral device manufacturer 476. This intermediate certificate held by the wireless peripheral device manufacturer 476 and signed by the root DICE certificate 499 at the backend management server 470 may be used to create a certificate chain in some embodiments herein. At line 405 a private key 496/public key 490 for the wireless peripheral device 452. At line 407, the generated public key 490 is retrieved by the wireless peripheral device manufacturer 476 and, at line 409, used to create a DICE certificate 494 over a public key 490 that is signed by the wireless peripheral device manufacturer 476. In an embodiment, the use of the DICE certificate 494 generated for each wireless peripheral device 476 is used to identify a wireless peripheral device 452 when a pairing session has been initiated. In an embodiment, the intermediate DICE certificate is used to create a DICE certificate 494 over a public key 490 at line 409 that corresponds to a private key 496 created at the wireless peripheral device 452 by the wireless peripheral device manufacturer 476 and stored on a memory device thereon. The DICE certificate 494 over a public key 490 created by the wireless peripheral device manufacturer 476 for the wireless peripheral device 452 is also sometimes referred to herein as a DICE certificate 494 and is installed, at line 411 onto a secure memory location within the wireless peripheral device 452.

As the user powers on the wireless peripheral device 452, the wireless peripheral device 452 may broadcast a PD ID 468 to the information handling system 400 at line 413. Again, transmissions between the wireless peripheral device 452 and the information handling system 400 may be conducted using the GATT profile transmission. The inclusion of the PD ID 468 in the broadcast causes the information handling system 400 to initiate a callback to cause the information handling system 400 to confirm the identity of the wireless peripheral device 452 at line 415 The PD ID 468 may be stored at the information handling system 400. The information handling system 400 retrieves the DICE certificate from the wireless peripheral device 482 over a GATT transmission for confirmation of the identity of the wireless peripheral device 452 at line 417. Along with this initial transmission of the PD ID 468, the wireless peripheral device 452 may transmit the DICE certificate via the GATT profile transmission at line 417. The DICE certificate 494 includes a public key 490, no other entity apart from the wireless peripheral device 452 (which holds the private key) can access information encrypted with that public key 490 such as that may be used by third-party entities during man-in-the-middle attacks. At line 419, the DICE certificate 494 is checked against the root DICE certificate 499 received from the backend management server 470 by the information handling system 400 either while the information handling system 400 was connected to the backend management server 470 via the network 436 or during manufacture of the information handling system 400. Where the root DICE certificate is not present for the DICE certificate 494, the BT pairing process is not completed. Where the DICE certificate 494 can be verified at line 419 via access to the root DICE certificate, the public key of the DICE certificate 494 may be extracted at line 421. As described herein, this public key 490 was included with the DICE certificate 494 while the wireless peripheral device 452 was with the wireless peripheral device manufacturer 476 and is associated with a private key held on the memory device of the wireless peripheral device 452.

After retrieving the public key 490 from the DICE certificate 494 at line 421, a hardware processor (e.g., EC, GPU, etc.) may be used to execute computer readable program code of a OOB temporary key generator agent. Execution of the OOB temporary key generator agent generates a OOB temporary key 466 at line 423 that is used to securely pair the wireless peripheral device 452 with the information handling system 400. In an embodiment, the execution of the OOB temporary key generator agent to create the OOB temporary key 466 may include the use of a random number generator (RNG) algorithm. The RNG algorithm, when executed by the OOB temporary key generator agent, may develop a set of random numbers that are unique to the pairing session between the wireless peripheral device 452 and information handling system 400. It is appreciated as well that other types of number generators may be executed by the OOB temporary key generator agent and the present specification contemplates the use of these other number generators.

At line 425, a copy of the OOB temporary key 466 may be stored on a secure memory location such as, for example, a unified extensible firmware interface (UEFI) memory location to secure the OOB temporary key 466 until used later. The OOB temporary key 466 may be stored as a UEFI variable in the UEFI memory location for later access by the OS BT stack 472.

In an embodiment, the hardware processor may execute computer readable program code of an automatic peripheral device pairing management system pairing agent 456 to encrypt another copy of the OOB temporary key 466 using the public key 490 at line 427. This encryption of the OOB temporary key 466 using the public key 490 by the execution of the automatic peripheral device pairing management system pairing agent 456 creates a public key-encrypted OOB temporary key 498 at the information handling system 400. In an embodiment, the automatic peripheral device pairing management system pairing agent 456 may execute any type of public-key cryptography at line 427. In a particular embodiment, the automatic peripheral device pairing management system pairing agent 456 executes a Rivet-Shamir-Adleman (RSA) public key cryptographic algorithm to encrypt or wrap the generated OOB temporary key 466 for transmission to the wireless peripheral device 452.

At line 429, the public key-encrypted OOB temporary key 498 is transmitted to the wireless peripheral device 452 using the GATT profile transmission described herein. Again, because wireless peripheral device 452 included the private key 496 and was the only source of the private key 496, only the wireless peripheral device 452 can decrypt the public key-encrypted OOB temporary key 498. In an embodiment, a microcontroller or other hardware processor may execute a decrypting agent 492 to, with the private key 496, decrypt the public key-encrypted OOB temporary key 498 to retrieve the copy of the OOB temporary key 466.

In an embodiment, at this point both the information handling system 400 and the wireless peripheral device 452 each have a copy of the OOB temporary key 466 to continue the pairing process. Again, the information handling system 400 may store the OOB temporary key 466 and PD ID 468 in a UEFI memory device 460 at line 425 as UEFI variable data 462 or store the OOB temporary key 466 in other secure memory locations in various memory devices in various embodiments. The UEFI memory device 460 on the information handling system 400 may be any memory device that maintains the OOB temporary key 466 for later retrieval by an operating system (OS) Bluetooth® (BT) stack (e.g., 472, FIG. 4) under direction of a hardware processor in one embodiment. In an embodiment, the UEFI variable data 462 is stored on a flash memory device associated with the basic input/output system (BIOS).

In an embodiment, the OS BT stack includes computer executable program code with hardware that, when executed by a hardware processor (e.g., embedded controller or any other hardware processing resource) along with code instructions of the automatic peripheral device pairing management system pairing agent 456 of the information handling system 400, performs automatic querying, verification, and initiation of BT pairing operations between the information handling system 400 and wireless peripheral device 452, and controls operations of a Bluetooth radio under any BT protocols, among other functions. A plurality of protocols may be present in the Bluetooth stack which may include core protocols including Bluetooth radio, baseband, link manage protocol, logical link control and adaptation protocol, and service discovery protocols. Further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio) used to transmit radio waves at a specific frequency as described herein. The frequency with which the Bluetooth stack of the Bluetooth radio queries the UEFI variable data 462 to determine if OOB temporary key 466 and PD ID 468 data is available may vary. In an embodiment, the Bluetooth stack may query the UEFI memory device 460 at line 435 for the UEFI variable data 462 during every power up of the information handling system 400. In an embodiment, the Bluetooth stack may query the UEFI variable data 462 on the UEFI memory device 460 a plurality of times when the information handling system 400 is powered up. Where available, the UEFI variable memory device 460 indicates, at line 437, that the OOB temporary key 466 and PD ID 468 are available. At line 439, the OS BT stack 472 requests the OOB temporary key 466 and PD ID 468 and the UEFI variable memory device 460 provides this data at line 441.

After decrypting the public key-encrypted OOB temporary key 498 at line 431, the wireless peripheral device 452 broadcasts the PD ID 468 via, for example, an OOB BT broadcast in a pairing query at line 433. That broadcasting indicates the availability of the wireless peripheral device 452 to continue the pairing process with the information handling system 400. In an embodiment, this broadcast includes a pairing request to the information handling system 400 to BT pair with the wireless peripheral device 452. In the embodiments herein, the OS BT stack associated with the Bluetooth radio may detect this PD ID 468 and, via execution of code instructions of the automatic peripheral device pairing management system pairing agent 456 of the information handling system 400, compare it to the PD ID 468 stored on the UEFI memory device at line 443.

Where the PD ID 468 provided by the wireless peripheral device 452 does not match the PD ID 468 accessed by the Bluetooth stack of the Bluetooth radio at line 443, the pairing process is not completed. Where the broadcasted PD ID 468 provided by the wireless peripheral device 452 matches the PD ID 468 stored in the UEFI memory device 460 at line 443, the automatic verification and initiation of BT pairing process may proceed via execution of code instructions of the automatic peripheral device pairing management system pairing agent 456.

In an embodiment, the Bluetooth stack of the Bluetooth radio may request, at line 445, certain received signal strength indicator (RSSI) data signal 435 from the wireless peripheral device 452. RSSI data signal is received by the BT radio of the information handling system 400 and the power level being received from the radio at the wireless peripheral device 452 (e.g., after calculated antenna and cable loss) can be determined. RSSI threshold data received by the wireless interface adapter of the information handling system 400 indicates whether, in an embodiment, the wireless peripheral device 452 is within a threshold range of the information handling system 400. In an embodiment where multiple wireless peripheral devices 486 are activated near the information handling system 400, the RSSI threshold may prevent other wireless peripheral devices 486 that are not within a threshold distance of the user's information handling system 400 from initiating automatic BT pairing. The RSSI power level provided by the wireless peripheral device 452 may be compared to an RSSI threshold value set at the Bluetooth radio of the information handling system 400. Where the wireless peripheral device 452 RSSI value does not meet or exceed the RSSI threshold value at line 449, the information handling system 400 may ignore the pairing request of the wireless peripheral device 452. Where the RSSI value meets or exceeds the RSSI threshold value at line 449, the OS BT stack of the Bluetooth radio within the information handling system 400 may continue the automatic verification and initiation of BT pairing process to establish a BT wireless link.

The automatic verification and initiation of the BT pairing process at line 451, in an embodiment, is executed by code instructions of the automatic peripheral device pairing management system pairing agent 456 of the information handling system 400 and includes the information handling system 400 verifying that the OOB temporary key 466 matches the OOB temporary key 466 now stored at the wireless peripheral device 452 attempting to BT pair with the information handling system 400. This may be done with a process where the OOB temporary key 466 is used to encrypt a message or data generated at the information handling system 400 with a confirm value generation function. The encrypted message is sent to the wireless peripheral device 452 and the OOB temporary key 466 there is used to decrypt the message and a message to compare to a second message generated there at the wireless peripheral device 452 with the confirm value generation function. The second message is generated at the wireless peripheral device 486 is encrypted, sent, and decrypted in the reverse between the wireless peripheral device 452 and the information handling system 400 for comparison as well. This exchange of message values encrypted and decrypted at both sides of the BT pairing may be conducted according to a confirm value generation function in various embodiments. With such encryption and decryption if the messages match, the OOB temporary key 466 and OOB temporary key 466 on the wireless peripheral device 452 may be verified as matching a BT pairing authorization verified in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 452 to the information handling system 400 and set up a BT wireless link with a session key. In an embodiment, the information handling system 400 and wireless peripheral device 452 can each provide various automatic querying, verification, and BT pairing communications that includes the OOB temporary key 466 verification and a pairing response command via an OOB BT communication prior to establishing a BT wireless link with a secure session key under any of the BT standards.

In an example embodiment, the information handling system 400 may encrypt an Mconfirm value generated there with a confirm value generation function and encrypted with its copy of the OOB temporary key 466 via an encryption algorithm, and then provide encrypted Mconfirm to the wireless peripheral device 452. The wireless peripheral device 452 decrypts this received Mconfirm value with its own stored copy of the OOB temporary key 466 at line 453. Further, the decrypted Mconfirm value may be compared to an Sconfirm value generated at the wireless peripheral device 452 using the confirm value generation function. The wireless peripheral device 452 encrypts the Sconfirm value with the OOB temporary key 566 and sends it to the information handling system 400 for decryption using the OOB temporary key 466 to determine the sent Sconfirm value at line 455. A match of the received Sconfirm from the wireless peripheral device 452 with the Mconfirm from the information handling system 400 may be used as verification that the wireless peripheral device 452 and information handling system 400 are assigned and authenticated to pair in such an example embodiment. Where the values match, the BT pairing process establishes a session key and a BT wireless link via the OS BT stack and BT protocols at line 457. Then the BT pairing process is completed between the wireless peripheral device 452 and information handling system 400. In an embodiment, once the wireless peripheral device 452 is paired with the information handling system 400, the OOB temporary key 466 is no longer used and the OOB temporary key 466 on both the information handling system 400 and the wireless peripheral device 452 may be deleted. Thus, in an embodiment, the OOB temporary key 466 may be a single use temporary key in some embodiments.

Figure 5A:
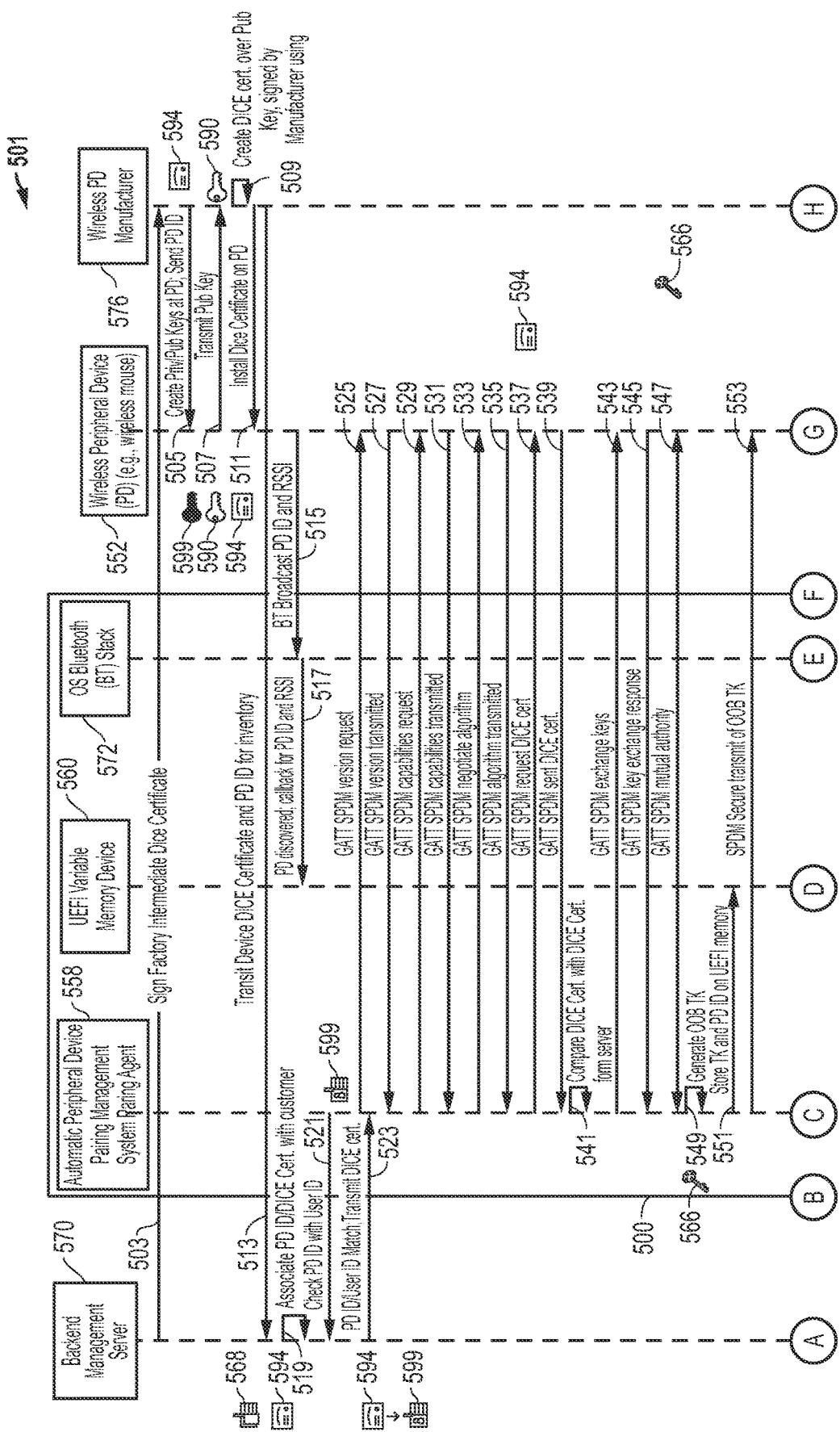

FIG. 5 is a process flow diagram of a method 501 of automatically querying, verifying, and Bluetooth® pairing a wireless peripheral device to an information handling system using a DICE certificate received from a wireless peripheral device according to an embodiment of the present disclosure. As described herein, the backend management server 570 may be an entity that includes a root DICE certificate used, in some embodiments, establish a root of trust between the backend management server 570 (e.g., as the source of trust) with any device that has a DICE certificate 594 signed by the root DICE certificate. In an embodiment, this root DICE certificate may be used to sign a factory server certificate at line 503 or, in the example embodiment described herein, a certificate associated with the wireless peripheral device manufacturer 576. This intermediate certificate held by the wireless peripheral device manufacturer 576 and signed by the root DICE certificate at the backend management server 570 may be used to create a certificate chain in some embodiments herein. At line 505 a private key 596/public key 590 may be generated at or assigned to the wireless peripheral device 552. At line 507, the generated public key 590 is retrieved by the wireless peripheral device manufacturer 576 and, at line 509, used to create a DICE certificate 594 over a public key 590 that is signed by the wireless peripheral device manufacturer 576. In an embodiment, the use of the DICE certificate 594 generated for each wireless peripheral device 552 is used to identify a wireless peripheral device 552 when a pairing session has been initiated. In an embodiment, the intermediate DICE certificate is used to create a DICE certificate 594 over a public key 590 at line 509 that corresponds to a private key 596 created at the wireless peripheral device 552 by the wireless peripheral device manufacturer 576 and stored on a memory device thereon. The DICE certificate 594 over a public key 590 created by the wireless peripheral device manufacturer 576 for the wireless peripheral device 552 is referred to herein as a DICE certificate 594 and is installed, at line 511 onto a secure memory location within the wireless peripheral device 552.

Additionally, at line 513, a copy of the peripheral device DICE certificate 594 and a PD ID 568 (e.g., a serial number associated with the wireless peripheral device 552) is passed to the backend management server 570 to be correlated or associated, at line 519, with the identification of the wireless peripheral device 552 (e.g., PD ID 568) and with an identity of a user who purchased the wireless peripheral device 552. For example, the backend management server 570 may include a list of users/information handling systems 500 that match, for example, purchasing data or other user identification data such that the wireless peripheral device 552 and its DICE certificate 594 and PD ID 568 can be associated with that user and the user's information handling system 500. This correlation of DICE certificate 594, PD ID 568, and user identification at line 519 may be stored on the backend management server database (not shown) for later retrieval.

As the backend management server 570 receives the copy of the DICE certificate 594 at line 513 and as the information handling system 500 receives a copy of the DICE certificate and PD ID 568, the wireless peripheral device 552 may be packaged and shipped to the user's location. It is appreciated that the wireless peripheral device 552 may be purchased using any means such as via an ecommerce store or other purchasing methods. The user may provide purchasing and shipping instructions not only for the wireless peripheral device 552 to be shipped to the correct location but also to identify the user at the backend management server 570 as described herein. As the user receives the wireless peripheral device 552, the user may turn on the wireless peripheral device 552 to initiate one of several different types of Bluetooth® (BT) pairing methods described herein.

At line 515, as the user powers on the wireless peripheral device 552, the wireless peripheral device 552 may broadcast a PD ID 568 to the information handling system 500. Again, transmissions between the wireless peripheral device 552 and the information handling system 500 may be conducted using a GATT profile transmission. The inclusion of the PD ID 568 in the broadcast causes the information handling system 500 to initiate a callback at line 517 to cause the information handling system 500 to, similar to other embodiments herein, request the backend management server 570 cross-reference the PD ID 568 received to those maintained on the backend management server database 572 at lines 521 and 523. Where a matching PD ID 568 exists at line, correlated user and information handling system 500 data may be transmitted to the information handling system 500 along with a copy of the DICE certificate 594 associated with the user and the information handling system 500 by the backend management server 570 as verification that the copy of the DICE certificate 594 matches the user and the PD ID 568 at line 523. It is appreciated that data transmissions between the information handling system 500 and backend management server 570 may be carried out via a secure transmission protocol such as transport layer security (TLS) protocols that use cryptographic protocols to prevent man-in-the-middle attacks from third-party entities.

Once the PD ID 568 has been verified, the information handling system 500 engages in a security protocol and data model (SPDM) binding to Bluetooth® protocol to initiate a private communication channel over Bluetooth® at lines 525 through 539 and lines 543 through 575. In an embodiment, this includes utilizing a Diffie-Hellman algorithm to create a tunnel over which a generated OOB temporary key 566 may be transmitted from the information handling system 500 to the wireless peripheral device 552. The SPDM binding to BT protocol includes the information handling system 500 requesting, at line 525, a version of the wireless peripheral device 552 and the wireless peripheral device 552 responding at line 527 with its version. The SPDM binding to BT protocol further includes the information handling system 500 requesting, at line 529, hardware and software capabilities of the device with the wireless peripheral device 552 responding, at line 531, with data describing those capabilities of the wireless peripheral device 552. Still further, the SPDM binding to BT protocol includes negotiating, at line 533, which algorithm to use to create the Diffie-Hellman communication tunnel with the wireless peripheral device 552 returning, at line 535, data describing the appropriate algorithm to use. Even further, the SPDM binding to BT protocol includes, in the present specification, a request from the information handling system 500, at line 537, to the wireless peripheral device 552 for the DICE certificate 594 maintained on the memory device of the wireless peripheral device 552. The wireless peripheral device 552 then sends, at line, 539, the DICE certificate 594 to the information handling system 500.

At line 541, the information handling system 500 may compare the DICE certificate 594 received over the SPDM binding to BT protocol communication channel to the DICE certificate 594 received from the backend management server 570. Where the DICE certificates 594 do not match, the pairing process is terminated. Where they do match, the SPDM binding to BT protocol continues with the information handling system 500 exchanging encryption session keys to create an encrypted session at lines 543, 545, and 547.

Once the encrypted session has been created, a hardware processor (e.g., EC, GPU, etc.) may be used to execute computer readable program code of a OOB temporary key generator agent. Execution of the OOB temporary key generator agent generates an OOB temporary key 566 at line 549 used to securely pair the wireless peripheral device 552 with the information handling system 500. In an embodiment, the execution of the OOB temporary key generator agent to create the OOB temporary key 566 may include the use of a random number generator (RNG) algorithm. The RNG algorithm, when executed by the OOB temporary key generator agent, may develop a set of random numbers that are unique to the pairing session between the wireless peripheral device 552 and information handling system 500. It is appreciated as well that other types of number generators may be executed by the OOB temporary key generator agent and the present specification contemplates the use of these other number generators.

In an embodiment, the OOB temporary key 566 may be stored, at line 5551, on a secure memory location such as, for example, a unified extensible firmware interface (UEFI) memory location to secure the OOB temporary key 566 until used later. The OOB temporary key 566 may be stored as a UEFI variable in the UEFI memory location for later access by an operating system (OS) Bluetooth® (BT) stack (not shown).

At line 553, the OOB temporary key 598 is transmitted to the wireless peripheral device 552 using the SPDM secure link transmission described herein. In an embodiment, at this point both the information handling system 500 and the wireless peripheral device 552 each have a copy of the OOB temporary key 566 to continue the pairing process. Again, the information handling system 500 may store the OOB temporary key 566 UEFI memory device 560 as UEFI variable data 562 or store the OOB temporary key 566 in other secure memory locations in various memory devices in various embodiments. The UEFI memory device 560 on the information handling system 500 may be any memory device that maintains the OOB temporary key 566 for later retrieval by an operating system (OS) Bluetooth® (BT) stack 572 under direction of a hardware processor (e.g., hardware processor 502) in one embodiment. In an embodiment, the UEFI variable data 562 is stored on a flash memory device associated with the basic input/output system (BIOS).

In an embodiment, the OS BT stack 572 includes computer executable program code with hardware that, when executed by a hardware processor (e.g., EC, GPU, or any other hardware processing resource) along with code instructions of the automatic peripheral device pairing management system pairing agent 558 of the information handling system 500, performs automatic querying, verification, and initiation of BT pairing operations between the information handling system 500 and wireless peripheral device 552, and controls operations of a Bluetooth radio under any BT protocols, among other functions. A plurality of protocols may be present in the Bluetooth stack which may include core protocols including Bluetooth radio, baseband, link manage protocol, logical link control and adaptation protocol, and service discovery protocols. Further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio) used to transmit radio waves at a specific frequency as described herein. In an embodiment, the OS BT stack 572 may query the UEFI variable memory device 560 to determine if OOB temporary key 566 exists at line 555. The UEFI variable memory device 560 may indicate, at line 557, that UEFI variable data exists. At line 559 the OS BT stack 572 may request the OOB temporary key 366 and the OOB temporary key 366 may be sent to the OS BT stack 572 at line 561. The frequency with which the Bluetooth stack of the Bluetooth radio queries the UEFI variable data 562 to determine if OOB temporary key 566 and PD ID 568 data is available may vary. In an embodiment, the Bluetooth stack may query the UEFI memory device 560 for the UEFI variable data 562 during every power up of the information handling system 500. In an embodiment, the Bluetooth stack may query the UEFI variable data 562 on the UEFI memory device 560 a plurality of times when the information handling system 500 is powered up.

At line 563, the information handling system 500 compares the PD ID 568 received from the backend server 570 to the PD ID 568 received from the wireless peripheral device 552. Where the PD ID 568 provided by the wireless peripheral device 552 does not match the PD ID 568 accessed by the Bluetooth stack of the Bluetooth radio, the pairing process is not completed. Where the broadcasted PD ID 568 provided by the wireless peripheral device 552 matches the PD ID 568 stored in the UEFI memory device 560, the automatic verification and initiation of BT pairing process may proceed via execution of code instructions of the automatic peripheral device pairing management system pairing agent 558.

In an embodiment, the Bluetooth stack of the Bluetooth radio may request certain received signal strength indicator (RSSI) data signal 535 from the wireless peripheral device 552 at line 565. RSSI data signal is received, at line 567, by the BT radio of the information handling system 500 and the power level being received from the radio at the wireless peripheral device 552 (e.g., after calculated antenna and cable loss) can be determined at line 569. RSSI threshold data received by the wireless interface adapter of the information handling system 500 indicates whether, in an embodiment, the wireless peripheral device 552 is within a threshold range of the information handling system 500. In an embodiment where multiple wireless peripheral devices 586 are activated near the information handling system 500, the RSSI threshold may prevent other wireless peripheral devices 586 that are not within a threshold distance of the user's information handling system 500 from initiating automatic BT pairing. The RSSI power level provided by the wireless peripheral device 552 at line 567 may be compared, at line 569, to an RSSI threshold value set at the Bluetooth radio of the information handling system 500. Where the wireless peripheral device 552 RSSI value does not meet or exceed the RSSI threshold value, the information handling system 500 may ignore the pairing request of the wireless peripheral device 552. Where the RSSI value meets or exceeds the RSSI threshold value at line 569, the OS BT stack 572 of the Bluetooth radio within the information handling system 500 may continue the automatic verification and initiation of BT pairing process to establish a BT wireless link.

At line 571, the automatic verification and initiation of the BT pairing process, in an embodiment, is executed by code instructions of the automatic peripheral device pairing management system pairing agent 558 of the information handling system 500 and includes the information handling system 500 verifying that the OOB temporary key 566 matches the OOB temporary key 566 now stored at the wireless peripheral device 552 attempting to BT pair with the information handling system 500. This may be done with a process where the OOB temporary key 566 is used to encrypt a message or data generated at the information handling system 500 with a confirm value generation function. The encrypted message is sent to the wireless peripheral device 552 and the OOB temporary key 566 there is used to decrypt the message and a message to compare to a second message generated there at the wireless peripheral device 552 with the confirm value generation function. The second message generated at the wireless peripheral device 486 is encrypted, sent, and decrypted in the reverse between the wireless peripheral device 552 and the information handling system 500 for comparison as well. This exchange of message values encrypted and decrypted at both sides of the BT pairing may be conducted according to a confirm value generation function in various embodiments. With such encryption and decryption if the messages match, the OOB temporary key 566 and OOB temporary key 566 on the wireless peripheral device 552 may be verified as matching a BT pairing authorization verified in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless peripheral device 552 to the information handling system 500 and set up a BT wireless link with a session key. In an embodiment, the information handling system 500 and wireless peripheral device 552 can each provide various automatic querying, verification, and BT pairing communications that includes the OOB temporary key 566 verification and a pairing response command via an OOB BT communication prior to establishing a BT wireless link with a secure session key under any of the BT standards.

In an example embodiment, the information handling system 500 may encrypt an Mconfirm value generated there with a confirm value generation function and encrypted with its copy of the OOB temporary key 566 via an encryption algorithm, and then provide encrypted Mconfirm to the wireless peripheral device 552. The wireless peripheral device 552 decrypts this received Mconfirm value with its own stored copy of the OOB temporary key 566 at line 573. Further, the decrypted Mconfirm value may be compared to an Sconfirm value generated at the wireless peripheral device 552 using the confirm value generation function. The wireless peripheral device 552 encrypts the Sconfirm value with the OOB temporary key 266 and sends it to the information handling system 500 for decryption using the OOB temporary key 566 to determine the sent Sconfirm value at line 575. A match of the received Sconfirm from the wireless peripheral device 552 with the Mconfirm from the information handling system 500 may be used as verification that the wireless peripheral device 255 and information handling system 500 are assigned and authenticated to pair in such an example embodiment. Where the values match, the BT pairing process establishes a session key and a BT wireless link via the OS BT stack and BT protocols at line 577. Then the BT pairing process is completed between the wireless peripheral device 552 and information handling system 500. In an embodiment, once the wireless peripheral device 552 is paired with the information handling system 500, the OOB temporary key 566 is no longer used and the OOB temporary key 566 on both the information handling system 500 and the wireless peripheral device 552 may be deleted. Thus, in an embodiment, the OOB temporary key 566 may be a single use temporary key in some embodiments.

The blocks of the flow diagrams of FIGS. 3, 4, and 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
a hardware processor;
a memory device;
a power management unit (PMU) to provide power to the hardware processor and memory device;
the hardware processor executing computer readable program code of an automatic peripheral device pairing management system pairing agent to receive, via a wireless interface adapter, a device identifier composition engine (DICE) certificate from a wireless peripheral device indicating the identity of the wireless peripheral device, and the DICE certificate including a public key;
the hardware processor executing computer readable program code of an out-of-band (OOB) temporary key generator agent to generate an OOB temporary key;
the hardware processor executing the computer readable program code of the automatic peripheral device pairing management system pairing agent to encrypt the OOB temporary key using the public key;
the hardware processor, via the wireless interface adapter, sending the public key-encrypted OOB temporary key to the wireless peripheral device to be decrypted using a private key at the wireless peripheral device; and
the hardware processor executing a confirm value generation function to confirm that the OOB temporary key matches the decrypted OOB temporary key at the wireless peripheral device to automatically Bluetooth® (BT) pair the information handling system to the wireless peripheral device.

2. The information handling system of claim 1 further comprising:
the hardware processor to execute the OOB temporary key generator agent to generate the OOB temporary key using a random number generator (RNG) algorithm.

3. The information handling system of claim 1 further comprising:
the hardware processor executing computer readable program code of the automatic peripheral device pairing management system pairing agent to compare the DICE certificate against a root DICE certificate received from a backend management server prior to BT pairing with the wireless peripheral device.

4. The information handling system of claim 1 further comprising:
the hardware processor, via the wireless interface adapter, sending the public key-encrypted OOB temporary key to the wireless peripheral device using a generic attribute profile (GATT) specification transmission.

5. The information handling system of claim 1 further comprising:
the hardware processor executing computer readable program code of the automatic peripheral device pairing management system pairing agent to receive, from a backend management server, a correlated wireless peripheral device identification (PD ID) to the DICE certificate indicating the wireless peripheral device has been assigned to the information handling system.

6. The information handling system of claim 1 further comprising:
the hardware processor executing computer readable program code of the automatic peripheral device pairing management system pairing agent to receive the DICE certificate via a generic attribute profile (GATT) specification transmission.

7. The information handling system of claim 6 further comprising:
the hardware processor executing the computer readable program code of the automatic peripheral device pairing management system pairing agent to encrypt the OOB temporary key using the public key via an Rivest-Shamir-Adleman (RSA) algorithm.

8. The information handling system of claim 1 further comprising:
the hardware processor executing computer readable program code of the automatic peripheral device pairing management system pairing agent to delete the OOB temporary key after the information handling system has been BT paired with the wireless peripheral device.

9. An information handling system comprising:
a hardware processor;
a memory device;
a power management unit (PMU) to provide power to the hardware processor and memory device;
the hardware processor executing computer readable program code of an automatic peripheral device pairing management system pairing agent to receive, via a wireless interface adapter, a device identifier composition engine (DICE) certificate via a generic attribute profile (GATT) specification transmission from a wireless peripheral device, the DICE certificate indicating the identity of the wireless peripheral device and wherein the DICE certificate includes a public key;
the hardware processor executing computer readable program code of an out-of-band (OOB) temporary key generator agent to generate an OOB temporary key;
the hardware processor executing the computer readable program code of the automatic peripheral device pairing management system pairing agent to encrypt the OOB temporary key using the public key;
the hardware processor, via the wireless interface adapter, sending the public key-encrypted OOB temporary key to the wireless peripheral device to be decrypted using a private key at the wireless peripheral device; and
the hardware processor executing a confirm value generation function to receive data to confirm that the OOB temporary key matches the sent OOB temporary key at the wireless peripheral device to automatically Bluetooth® (BT) pair the information handling system to the wireless peripheral device.

10. The information handling system of claim 9 further comprising:
the hardware processor to execute the OOB temporary key generator agent to generate the OOB temporary key using a random number generator (RNG) algorithm.

11. The information handling system of claim 9 further comprising:
the hardware processor executing the computer readable program code of the automatic peripheral device pairing management system pairing agent to encrypt the OOB temporary key using the public key via an Rivest-Shamir-Adleman (RSA) algorithm.

12. The information handling system of claim 9 further comprising:
the hardware processor executing computer readable program code of the automatic peripheral device pairing management system pairing agent to determine that a device identification for the peripheral device that is received with the DICE certificate is confirmed via a communication with a backend management server that the peripheral device is assigned to a user identification for the information handling system.

13. The information handling system of the claim 9 further comprising:
the hardware processor to execute the OOB temporary key generator agent to generate the OOB temporary key using a random number generator (RNG) algorithm.

14. The information handling system of claim 9 further comprising:
the hardware processor executing computer readable program code of the automatic peripheral device pairing management system pairing agent to compare the DICE certificate against a root DICE certificate received from a backend management server prior to BT pairing with the wireless peripheral device.

15. The information handling system of claim 9 further comprising:
the hardware processor executing computer readable program code of the automatic peripheral device pairing management system pairing agent to receive, from a backend management server, a correlated wireless peripheral device identification (PD ID) to the DICE certificate indicating the wireless peripheral device has been assigned to the information handling system.

16. An information handling system comprising:
a hardware processor;
a memory device;
a power management unit (PMU) to provide power to the hardware processor and memory device;
the hardware processor executing computer readable program code of an automatic peripheral device pairing management system pairing agent to receive, via a wireless interface adapter, a device identifier composition engine (DICE) certificate and a peripheral device identification (PD ID) from a backend management server, the PD ID indicating the assignment of the wireless peripheral device to the information handling system;
the hardware processor executing computer readable program code of the automatic peripheral device pairing management system pairing agent to, via the wireless interface adapter, establish a generic attribute profile (GATT) specification transmission using security protocol data model (SPDM) to securely receive a DICE certificate from the wireless peripheral device;
the hardware processor executing the computer readable program code of the automatic peripheral device pairing management system pairing agent to compare the DICE certificate received from the backend management server to the DICE certificate received from the wireless peripheral device to determine a match between the DICE certificates;
the hardware processor executing computer readable program code of an out-of-band (OOB) temporary key generator agent to generate an OOB temporary key and store the OOB temporary key in memory;

the hardware processor, via the wireless interface adapter, sending a copy of the OOB temporary key via a secure tunnel communication channel created by the GATT specification transmission to the wireless peripheral device; and the hardware processor executing a confirm value generation function to confirm that the OOB temporary key matches the securely sent OOB temporary key at the wireless peripheral device to automatically Bluetooth® (BT) pair the information handling system to the wireless peripheral device.

17. The information handling system of claim 16 further comprising:

secure tunnel communication channel created by the GATT specification transmission including a Diffie-Hellman asymmetric key algorithm.

18. The information handling system of claim 16 further comprising:

the hardware processor executing the computer readable program code of the automatic peripheral device pairing management system pairing agent to encrypt the OOB temporary key using the public key via an Rivest-Shamir-Adleman (RSA) algorithm.

19. The information handling system of claim 16 further comprising:

the hardware processor executing computer readable program code of the automatic peripheral device pairing management system pairing agent to delete the OOB temporary key after the information handling system has been BT paired with the wireless peripheral device.

20. The information handling system of claim 16 further comprising:

the hardware processor executing computer readable program code of the automatic peripheral device pairing management system pairing agent to store the OOB temporary key on a unified extensible firmware interface (UEFI) memory location.

* * * * *